(12) United States Patent
Bondurant et al.

(10) Patent No.: US 11,209,401 B2
(45) Date of Patent: Dec. 28, 2021

(54) ELECTROMAGNETIC ACOUSTIC TRANSDUCER (EMAT) FOR CORROSION MAPPING

(71) Applicant: QUEST INTEGRATED, LLC, Kent, WA (US)

(72) Inventors: Phillip D. Bondurant, Covington, WA (US); Anthony Mactutis, Auburn, WA (US); Richard Lyle Dougherty, Tacoma, WA (US)

(73) Assignee: QUEST INTEGRATED, LLC, Kent, WA (US)

( * ) Notice: Subject to any disclaimer, the term of this patent is extended or adjusted under 35 U.S.C. 154(b) by 209 days.

(21) Appl. No.: 16/490,479

(22) PCT Filed: Mar. 2, 2018

(86) PCT No.: PCT/US2018/020638
§ 371 (c)(1),
(2) Date: Aug. 30, 2019

(87) PCT Pub. No.: WO2018/160951
PCT Pub. Date: Sep. 7, 2018

(65) Prior Publication Data
US 2020/0011838 A1    Jan. 9, 2020

Related U.S. Application Data

(60) Provisional application No. 62/466,264, filed on Mar. 2, 2017.

(51) Int. Cl.
*G01N 29/04* (2006.01)
*G01N 29/24* (2006.01)

(52) U.S. Cl.
CPC ....... *G01N 29/2412* (2013.01); *G01N 29/043* (2013.01); *G01N 2291/0258* (2013.01)

(58) Field of Classification Search
CPC .. G01N 29/11; G01N 17/006; G01N 29/2412; G01N 29/043; G01N 2291/044;
(Continued)

(56) References Cited

U.S. PATENT DOCUMENTS

| 4,395,913 A | 8/1983 | Peterson |
| 5,689,070 A | 11/1997 | Clark et al. |

(Continued)

FOREIGN PATENT DOCUMENTS

| CA | 003013160 A1 * | 8/2017 | ........... G01N 29/043 |
| DE | 40 11 686 C1 | 7/1991 | |

(Continued)

OTHER PUBLICATIONS

Extended European Search Report, dated Nov. 13, 2020, issued in corresponding European Application No. 18761503.4, filed Mar. 2, 2018, 10 pages.

(Continued)

*Primary Examiner* — Jacques M Saint Surin
(74) *Attorney, Agent, or Firm* — Christensen O'Connor Johnson Kindness PLLC

(57) ABSTRACT

Systems and methods for detecting corrosion in pipes are disclosed herein. In one embodiment, an apparatus for detecting corrosion in an object includes an electromagnetic acoustic transducer (EMAT) having a ferromagnetic core and a plurality of permanent magnets arranged peripherally around the ferromagnetic core. The permanent magnets are arranged to produce a magnetic field through the ferromagnetic core. The apparatus also includes a coil between the ferromagnetic core and the object.

25 Claims, 19 Drawing Sheets

(58) Field of Classification Search
CPC ..... G01N 2291/0258; G01N 2291/015; G01N 2291/0234; G01N 29/343; G01H 11/06; G01B 17/02; B06B 1/08; B06B 2201/54
USPC .......................................................... 73/629
See application file for complete search history.

(56) References Cited

U.S. PATENT DOCUMENTS

| | | | |
|---|---|---|---|
| 6,234,026 B1 | 5/2001 | MacLauchlan et al. | |
| 7,202,652 B2 | 4/2007 | Umemoto et al. | |
| 7,711,217 B2* | 5/2010 | Takahashi | G01N 29/07 385/12 |
| 7,963,165 B2 | 6/2011 | Sinha | |
| 9,068,623 B2 | 6/2015 | Gysen et al. | |
| 9,681,996 B2 | 6/2017 | Prioleau et al. | |
| 2007/0151344 A1 | 7/2007 | Meethal et al. | |
| 2008/0260324 A1* | 10/2008 | Takahashi | G01N 29/2418 385/12 |
| 2012/0193179 A1 | 8/2012 | Gysen et al. | |
| 2017/0333946 A1* | 11/2017 | Cegla | G01N 29/2412 |
| 2019/0049411 A1* | 2/2019 | Kannajosyula | G01N 29/043 |
| 2020/0173773 A1* | 6/2020 | Pialucha | G01N 29/04 |

FOREIGN PATENT DOCUMENTS

| | | |
|---|---|---|
| EP | 0119000 B1 | 4/1989 |
| EP | 2369721 A2 | 9/2011 |
| GB | 2531835 A | 5/2016 |
| JP | S58116662 A | 7/1983 |
| JP | H09304356 A | 11/1997 |
| JP | 2014529731 A | 11/2014 |
| RU | 2265208 C1 | 11/2005 |

OTHER PUBLICATIONS

Van Den Berg, W.H., et al., "Development of an electromagnetic acoustic transducer for inspecting the wall thickness of offshore risers from the inside," Ultrasonics 26(1): 14-22, Jan. 1988.
Isla, J. and Cegla, F., "Optimization of the Bias Magnetic Field of Shear Wave EMATs," IEEE Transactions on Ultrasonics, Ferroelectrics and Frequency Control, Aug. 2016; 63(8) 1148-1160.
International Search Report and Written Opinion, dated May 18, 2018, issued in corresponding International Patent Application No. PCT/US2018/020638, filed Mar. 2, 2018, 12 pages.

\* cited by examiner

CROSS-SECTION A-A

DETAIL B-B

ELECTROMAGNETIC ACOUSTIC TRANSDUCER (EMAT) FOR CORROSION MAPPING

CROSS-REFERENCE(S) TO RELATED APPLICATION

This application is a national phase application under Sec. 371 of International Application No. PCT/US2018/020638, filed on Mar. 2, 2018, which claims the benefit of U.S. Provisional Application No. 62/466,264, filed on Mar. 2, 2017, the contents of which are incorporated herein by reference.

BACKGROUND

Metal structures are generally prone to corrosion and erosion. For example, pipelines typically develop corrosion over the outer surface of the pipes, while erosion can develop over their inside surfaces. Pipeline operators use the B31G standard to evaluate the "fitness for service" of the pipeline. During the evaluation, patches of corrosion on the pipes must be identified, and the spacing between the patches is estimated to determine if closely spaced patches should be considered as one continuous patch. Next, the axial extent and the maximum depth of the patch can be used as the evaluation criteria for each patch. The maximum depth of the corrosion patch determines the minimum useful wall thickness of the pipe.

FIG. 1 is a schematic view of crack detection in accordance with prior art. Some conventional technologies generate ultrasonic waves by a piezoelectric transducer or an electromagnetic acoustic transducer (EMAT) in a solid material 6 (e.g., a metal plate). The piezoelectric transducer includes a vibrating crystal 2 and a couplant 4 (e.g., gel or fluid) that transfers vibrations onto the solid material 6 (e.g., a steel plate). In another conventional technology, the EMAT 15 produces vibrations in the solid material 6. The EMAT 15 includes a permanent magnet 10 magnetically coupled with a coil 12. When the alternating current (AC) flows in the coil 12, the AC current in the coil 12 generates eddy currents in the solid material 6. The magnetic field of the permanent magnet 10 interacts with these eddy currents (through, for example, Lorentz force or magnetostriction) to produce ultrasonic waves that propagate through crystal lattice of the solid material. When the ultrasonic waves reach a crack or delamination 5 (or other discontinuity in the crystal lattice), a reflected ultrasonic wave is generated. These reflected waves can be detected by a receiver that is also an EMAT. At the receiving EMAT (not shown), the interaction of the reflected ultrasonic waves with the magnetic field of the receiving EMAT induces eddy currents in the material of the specimen, which in turn induce electrical currents in the receiving EMAT coil circuit. These induced currents can be measured, and further analyzed to characterize the crack, delamination, or wall thickness of the specimen. In some applications, the EMAT 15 serves as both an ultrasonic emitter and an ultrasonic receiver.

Corrosion can be particularly problematic for EMAT and piezoelectric transducer wall thickness measurements due to the scattering of the ultrasonic energy off the corrosion patches. Furthermore, EMATs operate with difficulty over the pipes having relatively thin walls, e.g., 0.25 to 0.5 inches with further thinning due to the corrosion, because the first return echo, which may be the only echo with a detectable amplitude, may be buried in the "main bang" of the signal. Accordingly, there remains a need for cost effective test methods that can accurately measure thickness of the wall pipe in presence of corrosion without a couplant.

DESCRIPTION OF THE DRAWINGS

The aspects of the present disclosure can be better understood with reference to the following drawings. The components in the drawings are not necessarily to scale. Instead, emphasis is placed on clearly illustrating the principles of the present disclosure.

DETAILED DESCRIPTION

Figure 1:
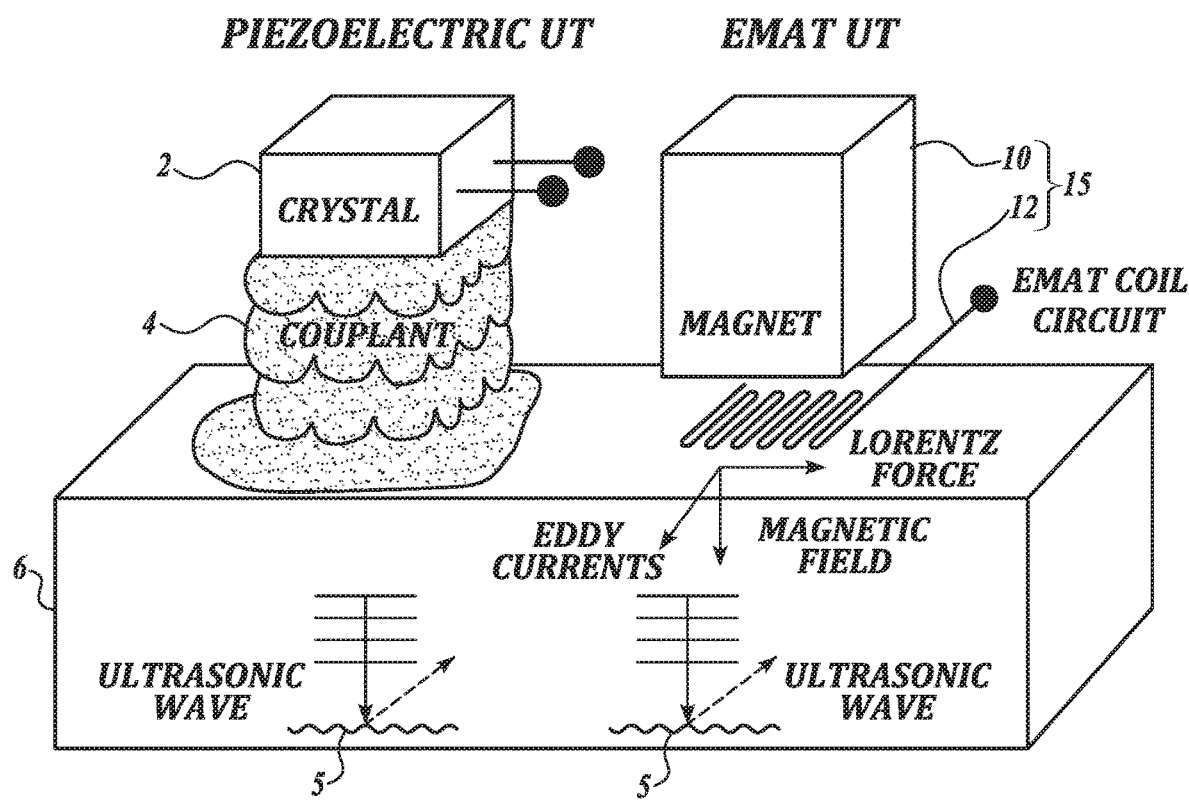
FIG. 1 is a schematic view of defect detection in accordance with prior art.

The inventive technology relates to EMAT (electromagnetic acoustic transducer) sensors that can quantify the remaining wall thickness of pipelines or other structures.

The inventive technology may be used in, for example, gas pipelines or empty pipes that lack a liquid couplant required for traditional piezoelectric (PZT) systems. In general, both the traditional liquid coupled PZT systems and EMAT wall loss systems have difficulty in obtaining measurements when the pipe is corroded significantly. In particular, the sloped sides of corrosion patches scatter the impinging ultrasonic signal, thereby either blurring the returning signal or entirely preventing the measurement of the reflected signal.

In operation, the EMAT sensor needs to maximize the probability of accurately determining the spacing between the patches of corrosion, the length of the corroded area, and the depth of the corrosion patch. In some embodiments, other defects in the object can be detected instead or in addition to the corrosion, for example, cracks or crystal structure imperfections in the object.

In some situations, the deep corrosion pits that define the remaining thickness of the wall within the patch of corrosion can have a relatively small cross-section. Even if not specifically targeted toward the B31G standard, finding the minimum remaining wall thickness is important for qualifying the remaining useful life of the pipe or other structures. Existing EMAT technology does not adequately detect the relatively small, but deep corrosion pits because of the relatively large size of the sensing area of the conventional EMATs. Some embodiments of the present technology that address this problem are described below. The present technology may be applicable to handheld or automated sensor applications from the outside of the pipe or to in-line-inspection applications from inside the pipe.

Generally, the smaller the sensing footprint of the EMAT, the higher the probability of obtaining a measurement from the bottoms of the corrosion pits since more energy is reflected from the corrosion patch if the direction of the ultrasound is perpendicular to the bottom of the corrosion pit. For example, an EMAT sensor having a relatively large footprint of the sensor may detect a relatively large, but shallow corrosion patch, while failing to detect a relatively small, but deep corrosion patch. In contrast with the typical EMAT sensor footprints having linear dimensions that are on the order of 0.5-1", with some embodiments of the present technology the linear dimensions of the sensor footprint are around ¼" to ⅜" or around ⅛" to ¼". Some embodiments of the present technology have EMAT sensor footprints that are round or approximately round with the diameters of around ¼" to ⅜" or around ¼" to ½" diameter.

In some embodiments of the inventive technology, the magnetic field strength is increased, resulting in a stronger magnetic field within small area, thus improving performance of EMAT sensors. Generally, the sensitivity of the EMAT (e.g., the ability of the EMAT to detect corrosion) scales with the square of the density of magnetic flux. Therefore, if the magnetic flux remains the same while the area of the magnetic field is, for example, twice smaller, the sensitivity of the EMAT sensor increases four times. Stated differently, in some embodiments, the inventive technology does not necessarily rely on stronger signals, but on the signals having the same strength over a smaller sensing footprint. In at least some embodiments, the increased density of the magnetic field increases the probability of receiving a return echo (or echoes) from the bottoms of corrosion patches with small axial and circumferential extent.

Some embodiments of the present technology can characterize the defects in the specimen (e.g., a depth of the corrosion pit) on the outer or inner surface of the specimen (e.g., a pipe). Some of the considerations for the design of an EMAT sensor for pipes and other structures (e.g., flat walls) having thin walls with corrosion are:

1. Sensor ring-down/dead time;
2. OD (outside diameter) Surface Ultrasonic Scattering;
3. ID (inside diameter) coupling; and
4. Sensor size versus corrosion topology.

Sensor Ring-Down/Dead Time

Figure 2A:
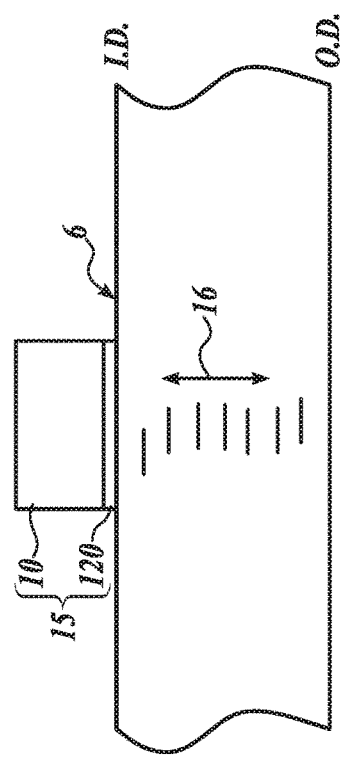
FIG. 2A is EMAT amplitude scan (ASCAN) response for a pipe with non-corroded wall in accordance with prior art.
Figure 2A:
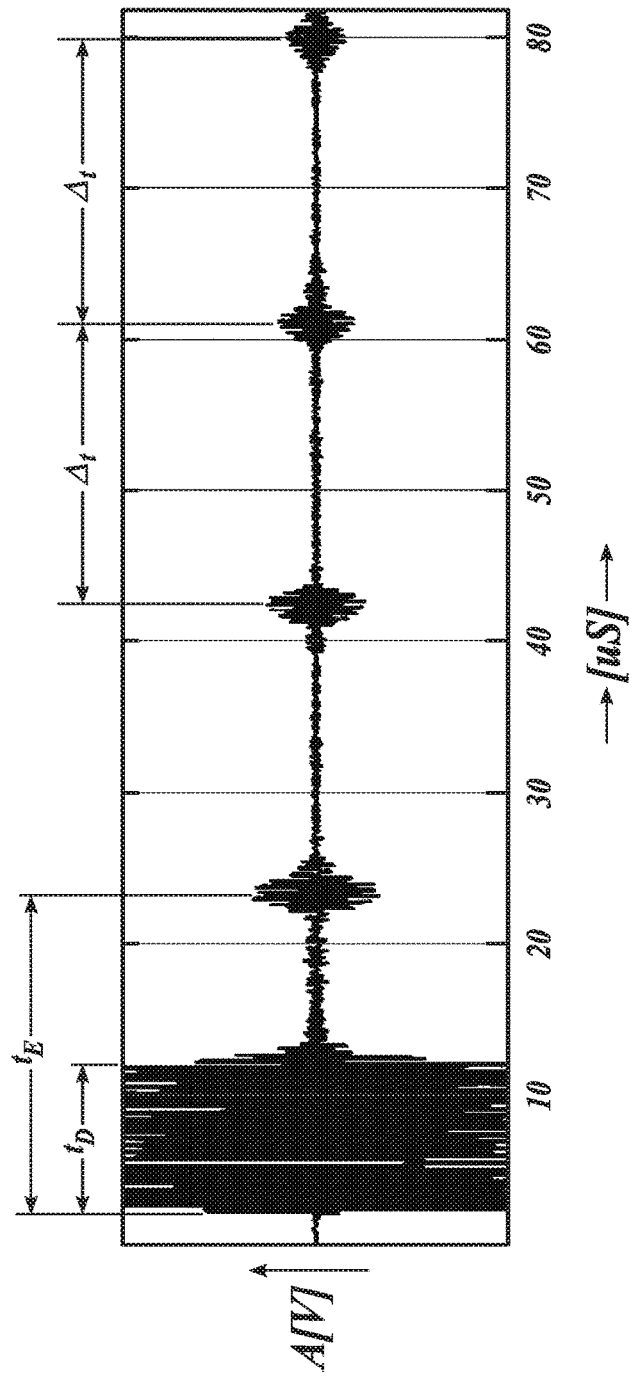

FIG. 2A is EMAT amplitude scan (ASCAN) response for a pipe with non-corroded wall in accordance with prior art technology. The graph in FIG. 2A shows time on the horizontal axis and signal amplitude on the vertical axis. The initial period characterized by the high intensity of the signal amplitude (also referred to as "main bang") corresponds to the period of time when the coil 120 sends the electromagnetic signal into the pipe (the specimen). As explained above, the electromagnetic signal is transformed into an ultrasound. signal in the crystal matrix of the pipe material; the ultrasound signal reflects off the imperfections in the crystal matrix (e.g., corrosion, crack, delamination or the edge of the material); and the reflected waves area sensed by the coil 120. Since the coil 120 is essentially saturated with the transmitted signal ("main bang") for the duration of time $t_D$ ("dead time" or "ring down" time), the coil 120 is unavailable for the sensing during this time. At the time $t_E$, the first reflected signal ("echo") is received and sensed by the coil 120. Afterwards, the ultrasound waves that propagate back-and-forth in a direction 16 are sensed by the coil 120 at the time intervals $\Delta_t$. In the illustrated embodiment, $t_D$ is about 10 μs long, $t_E$ is about 22 μs long, and $\Delta_t$ is about 18 μs long. In other embodiments, other time intervals may apply. For example, $t_E$ and the time interval $\Delta_t$ increase with the thickness of the pipe. In general, the sensor should rely on multiple reflections when measuring the corrosion.

Furthermore, for the relatively thin pipe walk, for example for pipe walls of about 0.2.5 to 0.5 inches, not including the corrosion, the length of the dead time may affect the measurements. For instance, the first reflection from the 0.4" and 0.1" thick wall is around 6.2 μs and 1.5 μs, respectively, which, for the illustrated case, would be masked by the dead time $t_D$ that is about 10 μs long.

OD Surface Ultrasonic Scattering

Figure 2B:
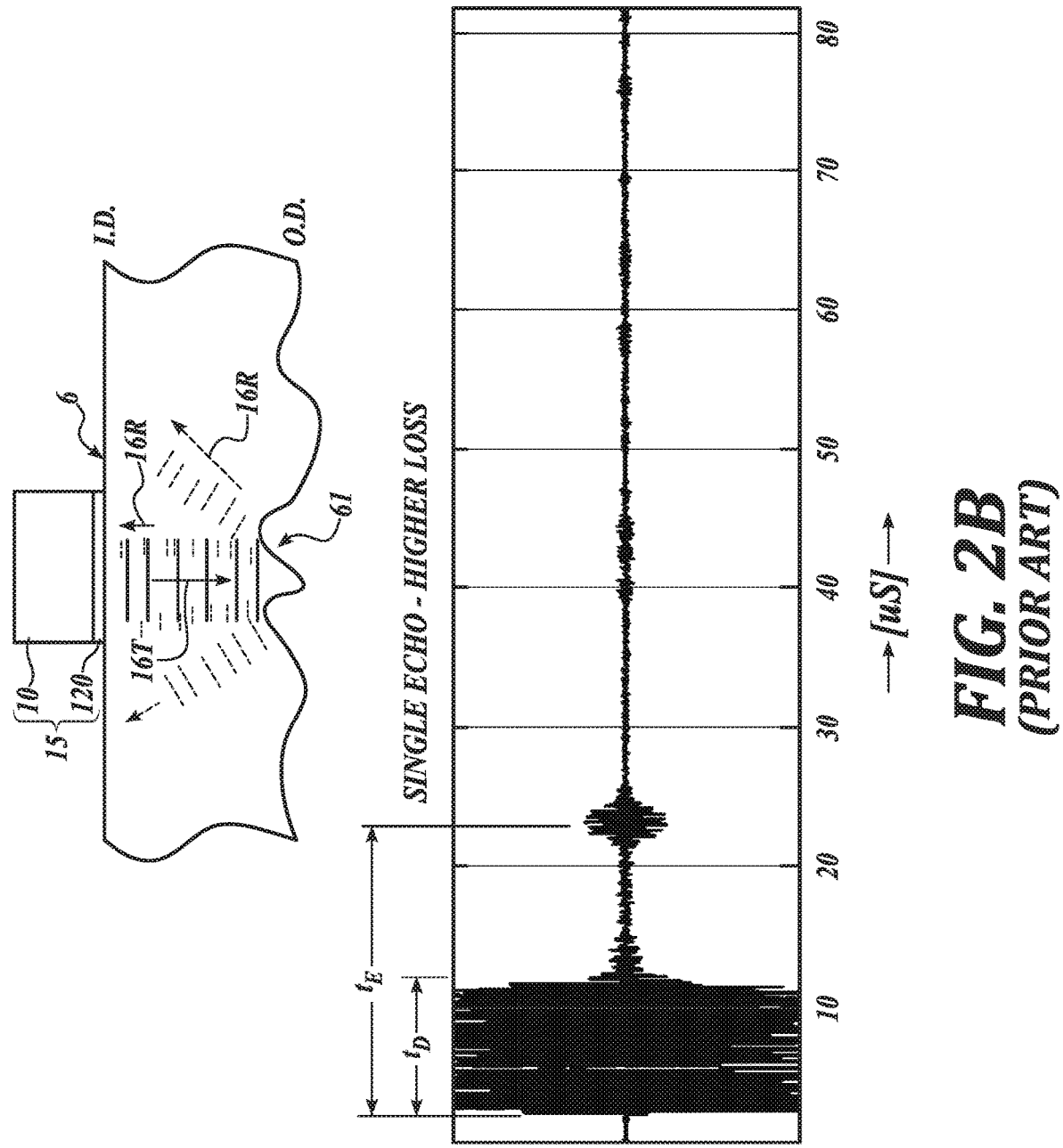
FIG. 2B is EMAT ASCAN response for a pipe with corroded wall in accordance with prior art.

FIG. 2B is EMAT ASCAN response for a pipe with corroded wall in accordance with prior art. In general, EMAT ASCAN produces multiple reflections on non-corroded surfaces or surfaces where the corrosion topology variation is much larger than the sensor dimensions. However, when the corrosion patch 61 includes topology that is smaller than the sensor dimension, the reflections from the corrosion patch 61 are more scattered. As a result, EMAT sensor's ability to make measurements in corroded areas is reduced, as explained below.

In some embodiments, the EMAT 15 transmits ultrasound 16T toward the corrosion patch 61, and receives the reflected ultrasound 16R. However, the uneven surface of the patch 61 causes scattering of the reflected ultrasound 16R As a result, a number of observable ultrasound echoes is reduced. In some embodiments, only one observable echo is produced, as illustrated in the graph of FIG. 2B. In the illustrated embodiment, because of the dead times for EMAT sensors, the first echo may not be detectable for pipe wall that are thinner than approximately 0.6 inches, because the ring-down time ($t_D$) masks the first echo, and the operator would need additional echoes to make the measurement. In a situation where the corrosion resulted in a significant wall loss, the EMAT may simply report "no reading." As a result, in some embodiments, the sensor may not receive any echo and the measurement cannot be made.

ID Coupling

As explained above, EMAT sensors create the ultrasonic signal in the pipe wall through the interaction of eddy currents in the pipe with a co-located static magnetic field. This transduction method provides an advantage for the use of EMAT in the field, because ultrasound coupling (e.g., through a coupling fluid or gel) is not required.

For a send/receive EMAT, the ultrasonic signal is proportional to the square of the static magnetic field and is linear with respect to the transmit coil current. The static magnetic field and induced RF current get smaller as the distance between the sensor and the surface (also referred to as a "lift-off" distance) increases. In some embodiments, the lift-off range of an EMAT sensor may be about 2 mm. In some embodiments the corrosion or erosion of the inner surface (ID) of the pipe may effectively increase lift-off, resulting in a loss of the ASCAN signal (e.g., the system reports "no reading"). Therefore, in some embodiments, a mechanical design of the EMAT tool keeps the sensor reliably against the surface of the pipe to minimize lift-off and/or lift-off variations. In some embodiments, augmenting measurement methods, such as laser surface mapping, can map the ID surface to determine the extent of ID corrosion. To reduce ID coupling problems, the sensor may operate at higher static magnetic field strength and higher RF current levels.

Sensor Size Versus Corrosion Topology

Figure 2C:
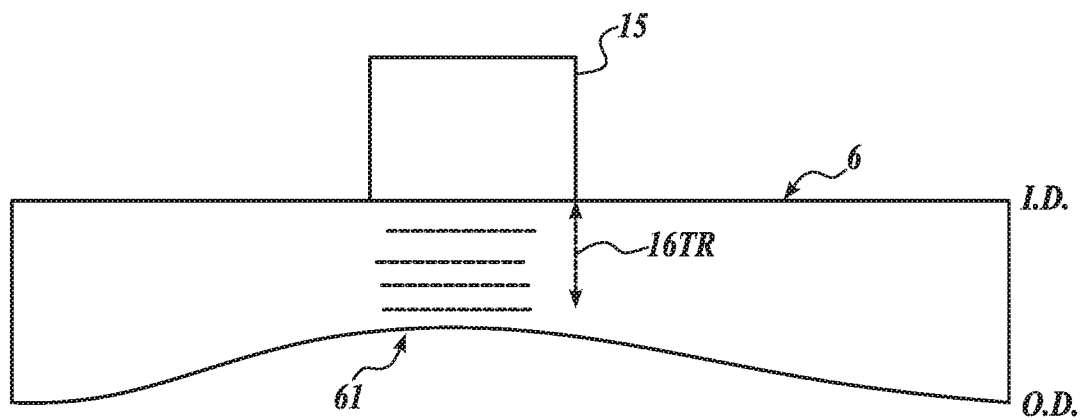
FIGS. 2C and 2D are partially schematic representations of sensor size versus corrosion topology in accordance with embodiments of the presently disclosed technology.
Figure 2D:
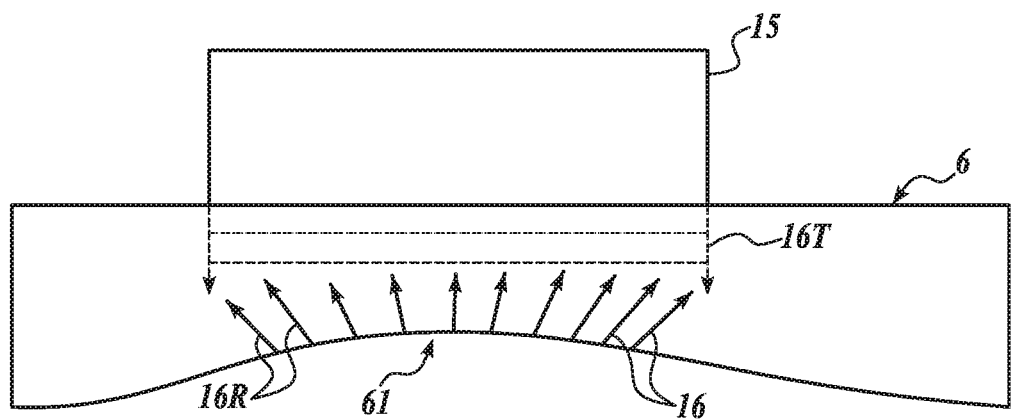

FIGS. 2C and 2D are partially schematic representations of sensor size versus corrosion topology in accordance with embodiments of the presently disclosed technology. In some embodiments, the size of the EMAT sensor 15 can be reduced to mitigate signal scattering caused by the corrosion 61. For example, FIG. 2D illustrates a relatively large EMAT 15 that spans a significant variation in the surface slope of the corrosion 61. In many practical situations, the useful reflected ultrasonic waves 16R are reflected only or predominantly off the corrosion peaks. On the other hand, the sloped areas of the corrosion 61 reflect ultrasound waves away from the useful measurement direction, which is back toward the EMAT 15.

Such scattering of the reflected ultrasound waves causes certain issues: different signal path lengths causing blurring, mode conversion, shear wave polarization rotation, and missed reflected energy, all of which reduce the reflected signal level and/or cause blurring of the return echoes. However, if the same energy can be focused within a smaller area, the percentage of the corrosion peak width (where the corrosion is deepest) becomes a larger percentage of the EMAT sensing area, therefore increasing the probability of a good measurement. In some embodiments, the EMAT sensing area (i.e., the area having high magnetic flux through the coil 120) may have the linear dimension of the sensor footprint of around ¼" to ⅜", or around ⅛" to ¼". Some embodiments of the present technology have the EMAT sensor footprints that are round or approximately round with the diameters of around ¼" to ⅜" or around ¼" to ½". In some embodiments, the sensor footprints may have less than ¼" linear dimension or diameter. In some embodiments, the above-listed area sizes correspond to the areas of the target corrosion peaks.

Figure 3:
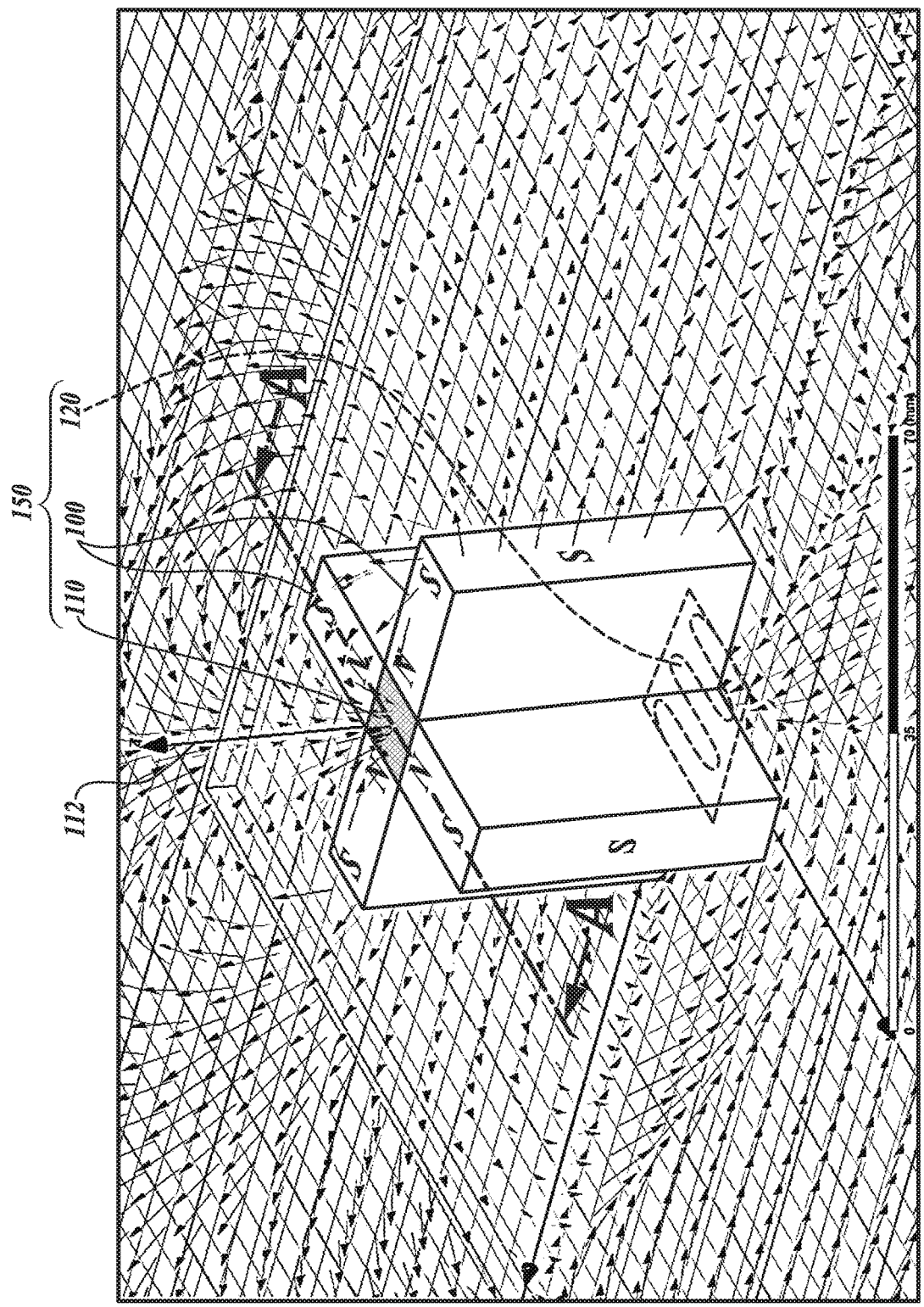
FIG. 3 is a schematic view of an EMAT having a ferromagnetic core in accordance with an embodiment of the presently disclosed technology.

FIG. 3 is a schematic view of an EMAT having a ferromagnetic core in accordance with an embodiment of the presently disclosed technology. In particular, FIG. 3 includes modeling results for four radially facing magnets 100 around a ferromagnetic core 110 having a 10 mm square base, and being 40 mm tall. The magnets 100 are N35 Nd 10 mm thick, 20 mmi wide, and 40 mm tall. The simulations were run with this configuration over 4 mm and 8 mm thick steel plate in some runs, and over aluminum in other simulation runs. For the static simulations, aluminum has the same magnetic permeability as air. The vector field represents the magnetic field caused by the magnets 110.

The illustrated EMAT 150 includes high-saturation ferromagnetic core 110 above the RF coil 120. The pipe under test (not shown) would be further below the RF coil 120. Individual magnets 100 are oriented to face the ferromagnetic core 110 with the same poles, e.g., with their North (N) poles. In some embodiments, the individual magnets 100 may face the ferromagnetic core 110 with their South (S) poles. In some embodiments, the magnets 100 are square or round rare-earth magnet. In some embodiments, the magnets 100 are stacked on top each other along the vertical length of the ferromagnetic core 110 to achieve a required height of the magnets 100.

With the conventional, single magnet EMAT, the maximum magnetic field is the Br or the remnant magnetization (e.g., about 1.5 Tesla for the Nd N52 material). This value is not obtained in practice due to the air gap in the magnetic flux path around the magnet 100. In air, the magnetic surface field is approximately 0.65 T for a single magnet (prior art configuration), which increases to approximately 1 T when the magnet 100 is placed over steel or other ferromagnetic material. In some embodiments of the present technology, the relatively short magnetic path between the opposing poles of the magnets 100 may increase the magnetic field strength (also referred to as the magnetic flux density) to about 2.3T. Arrow 112 indicates the direction of the magnetic field in the middle of the ferromagnetic material 110. With the conventional EMATs that rely on a conventional single magnet arrangement, the magnetic field strength is typically about 1 T. Since the sensitivity of the EMAT varies as the square of the magnetic field strength, a 2.3× increase in the magnetic field strength causes about 5.3× increase in signal level detection (also referred to the sensitivity of the EMAT) for a fixed sensing area. Consequently, with the inventive technology, the sensing area can be reduced while achieving the same or better EMAT sensitivity. For example, the signal levels obtainable with our ¼" square sensing area in the inventive technology may be comparable to the signal levels obtainable with the 1" square sensing area of the conventional EMAT sensor. As a result, the inventive technology may produce a 16× apparent improvement when considering the sensor area. Furthermore, since the area of the coil 120 can be significantly larger than the sensing area, the liftoff performance of the EMAT is also improved. The reduction in the sensing area may have added benefits when detecting the corrosion patch that is relatively small, as explained with reference to FIGS. 2C and 2D above.

In different embodiments the coil 120 may have different geometries, for example, a spiral coil and a linear coil. Both spiral and linear coils are flat coils that fit between the ferromagnetic core 110 and the surface of the specimen. The linear coil can be implemented in the shape of "D" or two back to back "D's," sometimes called a "butterfly coil."

Acoustically, the spiral coil generates a radially polarized shear wave and the linear coil creates a linearly polarized shear wave. Theoretically, the radially polarized coil produces a cone of energy with little energy going straight into the material. The direction is dependent on the winding spacing. The linear coil produces waves that are directed vertically. The inventors have found that the linear coil may be better at producing a longer string of multiple echoes as compared to the spiral coil. On the other hand, the spiral coil may produce stronger first echoes that decay faster.

In some embodiments, multi-modal bulk/guided waves can be used. In some embodiments, bulk wave transducer is configured to produce ultrasound that propagates at an oblique angle of incidence through the specimen (i.e., the ultrasound waves travel in a non-perpendicular direction with respect to a surface of the specimen).

Figure 3A:
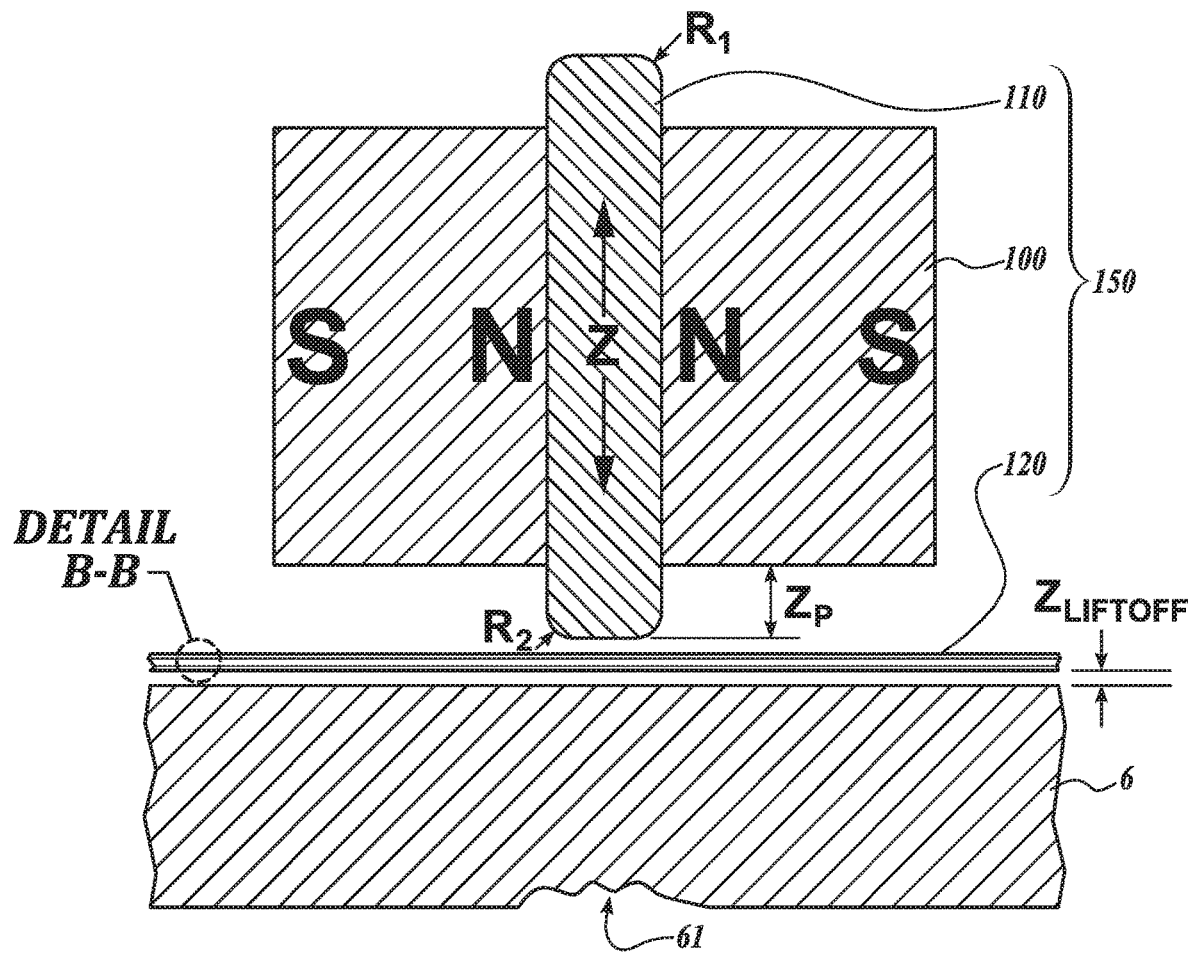
FIG. 3A is a cross-sectional view of the EMAT shown in FIG. 3.

FIG. 3A is a cross-sectional view of the EMAT shown in FIG. 3. In some embodiments, the ferromagnetic core 110 protrudes by the distance $Z_p$ below the lower surface of the magnets 100. In some embodiments, the ferromagnetic core 110 may be movable in the vertical direction (direction Z) with respect to the magnets 100, therefore resulting in a variable $Z_p$. Consequently, a distance from the ferromagnetic core 110 to the coil 120 and further to the specimen 6 also changes. When reduced attraction force between the specimen and the EMAT is wanted, for example, when the EMAT 150 is moved from one location on the pipe to another, the distance between the ferromagnetic core 110 and the specimen may be increased by sliding (or otherwise vertically retracting) the ferromagnetic core 110 within the magnets 100.

The lift-off ($Z_{LIFTOFF}$) is a distance between the coil 120 and the surface of the specimen 6. As explained above, smaller lift-off typically increases the magnetic field and the eddy currents in the specimen 6, resulting in improved sensitivity of the EMAT 150. Furthermore, the magnetic field generated by the magnets 110 travels through the extended ferromagnetic core 110, and through the coil 120 into the specimen, thereby reducing the losses caused by the travel of the magnetic field through air.

In some embodiments, the edges of the ferromagnetic core 110 may be rounded (indicated by radiuses R1 and R2). For example, the radius R2 at the lower end of the ferromagnetic core may reduce wear and tear of the coil 120 by eliminating corners that can gouge the coil. The radius R1 on the upper end of the ferromagnetic core 110 promotes faster dissipation of the acoustic waves generated in the ferromagnetic core, such that these unwanted acoustic waves interfere less with the acoustic signal in the pipe.

Figure 3B:
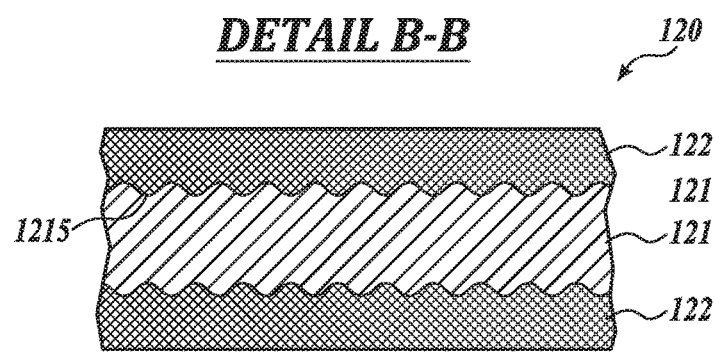
FIG. 3B is a detail view of one trace of the EMAT coil shown in FIG. 3.

FIG. 3B is a detail view of the EMAT coil shown in FIG. 3. In some embodiments, the electrically conductive traces 121 of the coil 120 are encapsulated in cladding 122. In some embodiments, the cladding 122 may be a sound deadening or sound absorbing material (e.g., a filled epoxy) that reduces the EMAT signals generated in the coil 120, therefore improving the quality of the measurements (e.g., signal to noise ratio or S/N ratio).

In some embodiments, the edges of the conductive traces 121 may be serrated. When the electromagnetic field propagates through the conductive traces 121, serrations 1215 defocus and/or scatter the reflections that naturally occur within the conductive traces. As a result, the S/N ratio of the EMAT may further improve. In some embodiments, the traces 121 may have mm-scale diameter, while the serrations 1215 are one or more magnitudes of order smaller than the diameter of the traces.

Figure 4:
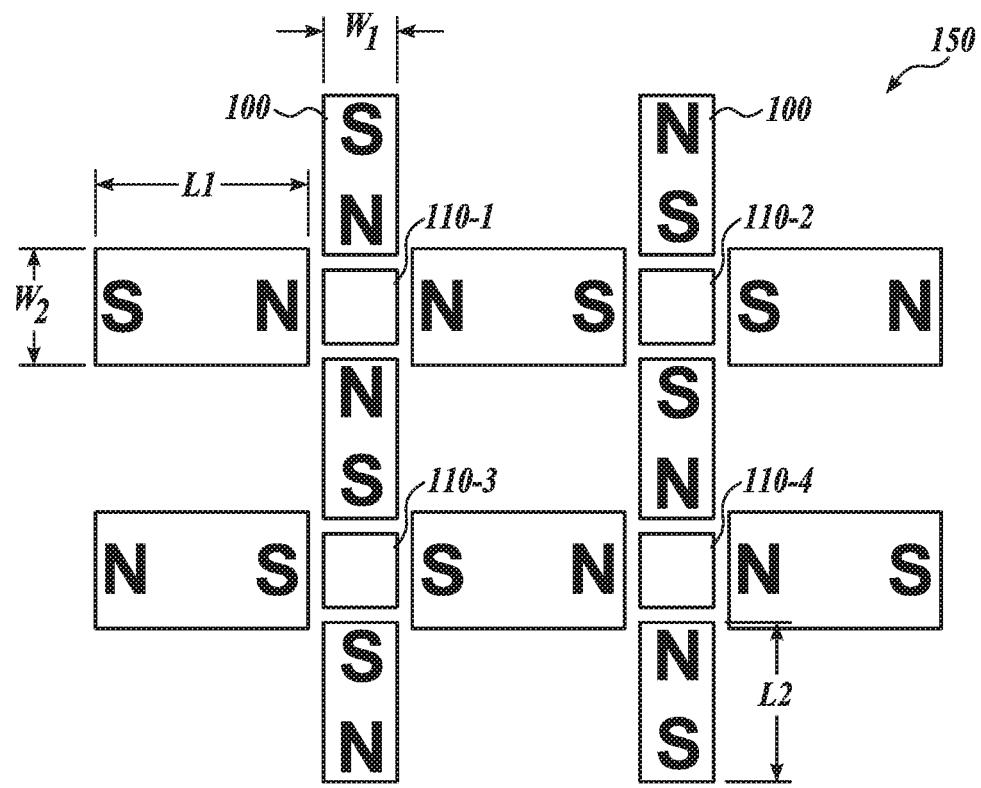
FIG. 4 is a schematic view of a layout of an EMAT in accordance with an embodiment of the presently disclosed technology.

FIG. 4 is a schematic view of a layout of an EMAT in accordance with an embodiment of the presently disclosed technology. In the illustrated embodiments, the magnets 100 are arranged to create multiple sensing areas under multiple ferromagnetic cores 110. For example, the north poles N of the magnets 100 may generate the magnetic flux through the ferromagnetic cores 110-1 and 110-4, while the south poles S of the magnets 100 generate the magnetic flux through the magnetic cores 110-2 and 110-3. The resulting EMAT 150 includes multiple ferromagnetic core/coil pairs capable of sensing multiple areas of the specimen.

Depending on the layout of the magnets, at least some magnets 100 may have both poles N, S engaged to generate the magnetic flux through the ferromagnetic cores 110. In some embodiments, the magnets 100 may have different lengths, e.g., L1 and L2. In some embodiments, the widths W1, W2 of the magnets may be different. For example, some magnets may have the width W2 that is larger than the side of the ferromagnetic core 110-1 that they face. Without being bound to theory, it is believed that the magnets with the larger width W2 may increase the strength of the magnetic field.

Figure 5A:
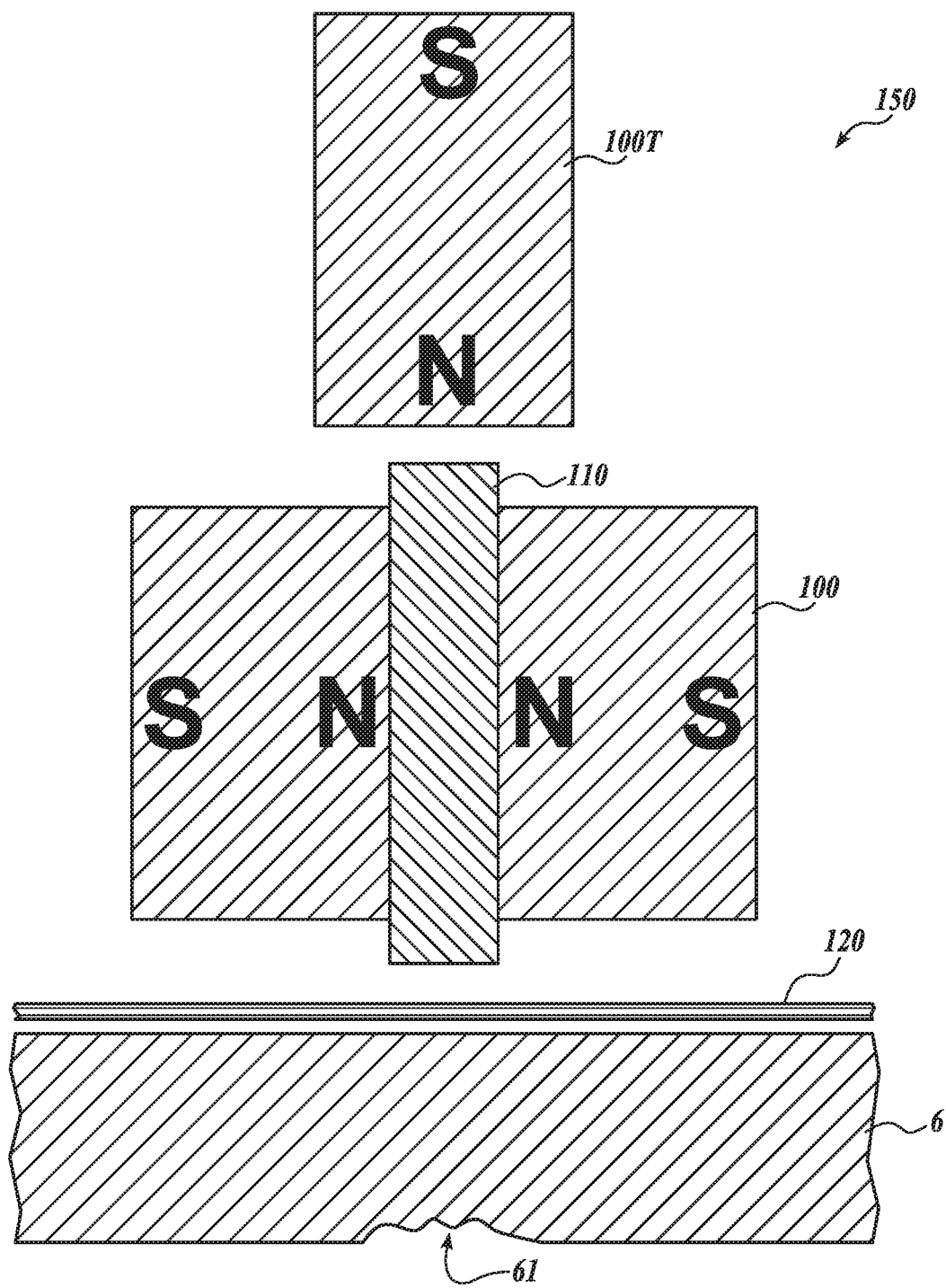
FIG. 5A is a cross-sectional view of an EMAT in accordance with an embodiment of the presently disclosed technology.

FIG. 5A is a cross-sectional view of an EMAT in accordance with an embodiment of the presently disclosed technology. In some embodiments, the EMAT 150 includes additional magnets, for example a magnet 100T. In operation, the north pole of the magnet 100T faces the top of the ferromagnetic core 110. In at least some embodiments, additional magnetic flux from the magnet 100T increases the magnetic flux density in the ferromagnetic core 110. As a result, the magnetic flux density and, therefore, the sensitivity of the EMAT 150 (e.g., the ability of the EMAT 150 to detect corrosion) is also increased.

Figure 5B:
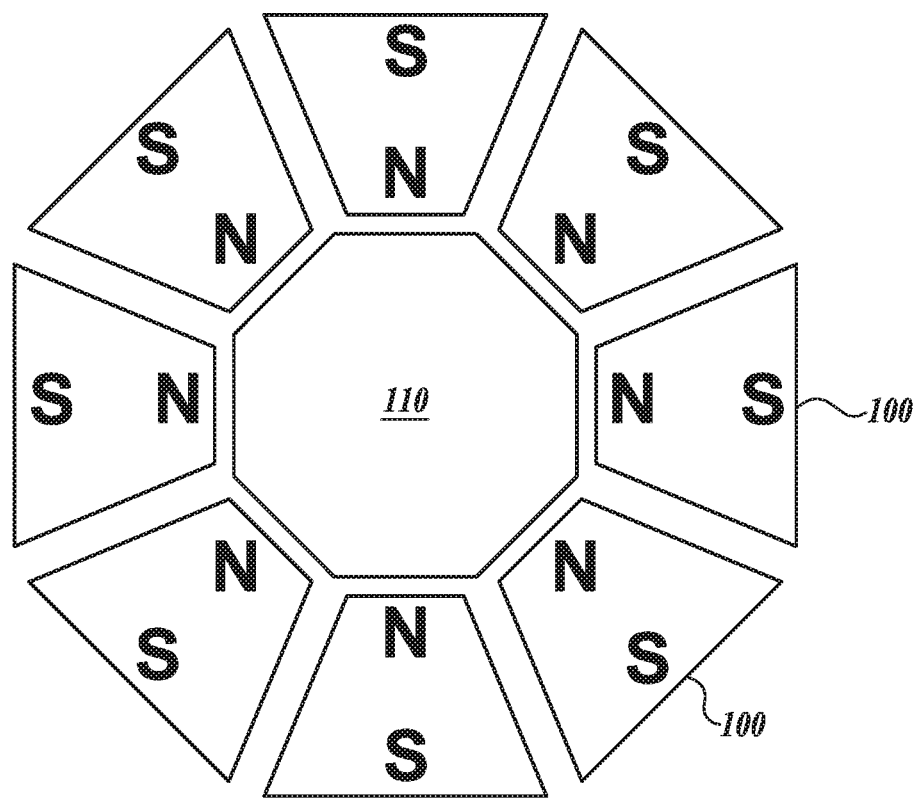
FIG. 5B is a cross-sectional view of an EMAT in accordance with an embodiment of the presently disclosed technology.

FIG. 5B is a cross-sectional view of an EMAT in accordance with an embodiment of the presently disclosed technology. In some embodiments, the EMAT 150 includes the magnets 100 that are wedge-shaped. As a result, an increased number of the magnets 100 may be arranged to face the ferromagnetic core 110, therefore increasing the overall magnetic flux density through the ferromagnetic core, which, in turn, increases the sensitivity of the EMAT 150 (e.g., the ability of the EMAT 150 to detect small-size corrosion). In the illustrated embodiment, eight magnets 100 face an octagonal ferromagnetic core, but other numbers of the magnets and the corresponding shapes of the ferromagnetic core are also possible. In some embodiments, a cylindrical ferromagnetic core 110 may be surrounded by the magnet 100 that is shaped as a hollow cylinder having, for example, its north pole at the inner diameter and its south pole at the outer diameter.

Figure 6A:
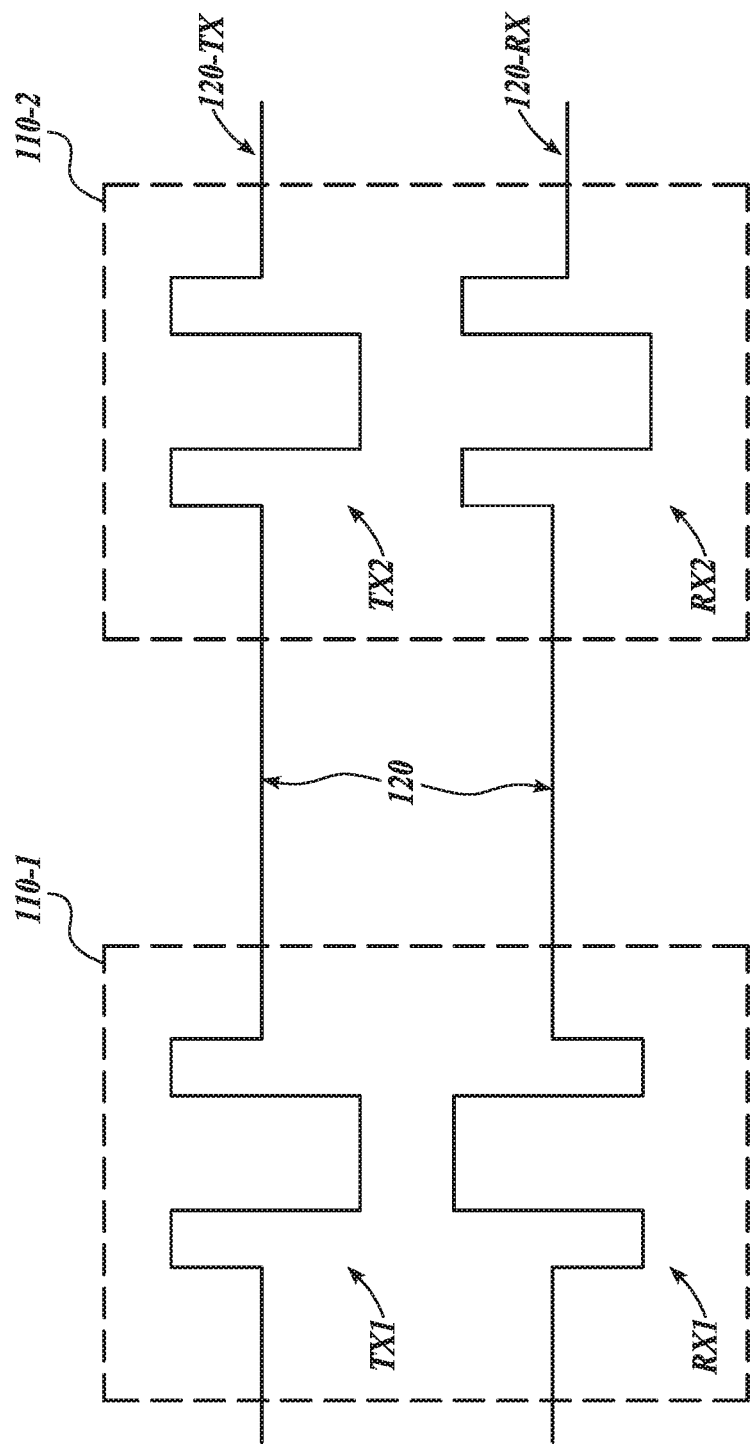
FIG. 6A is a schematic view of EMAT coils in accordance with an embodiment of the presently disclosed technology.
Figure 6B:
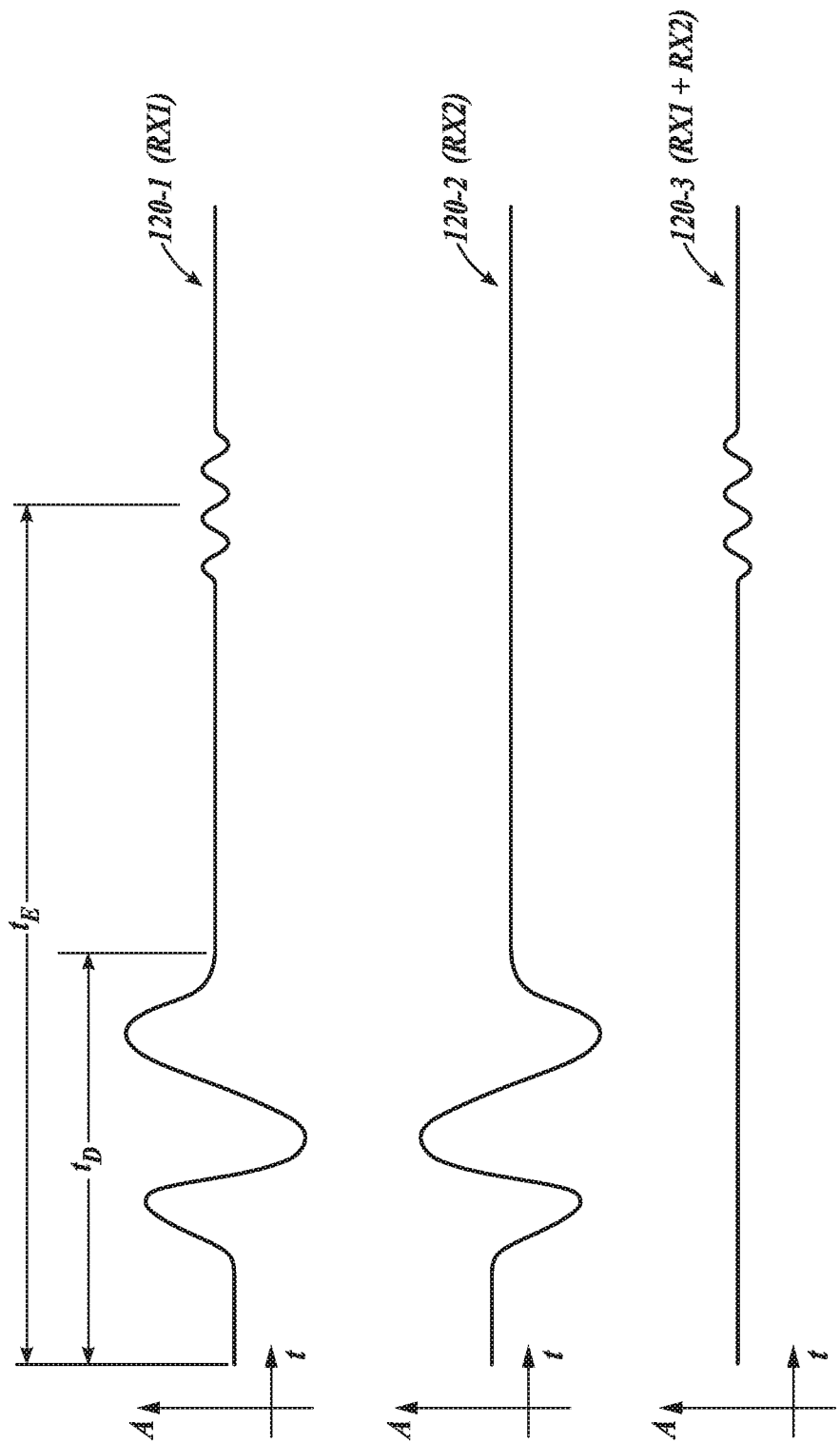
FIG. 6B is a graph of coil signals in accordance with an embodiment of the presently disclosed technology.

FIGS. 6A and 6B illustrate an arrangement of the coil 110 for improved S/N ratio and reduced ring down of the main bang of the received signal. FIG. 6A is a schematic view of conductive traces of the EMAT coil in accordance with an embodiment of the presently disclosed technology. FIG. 6B is a graph of coil signals in accordance with an embodiment of the presently disclosed technology.

FIG. 6A shows a transmitter trace 120-TX and a receiver trace 120-RX of the coil 120. In operation, a ferromagnetic core 110-1 may be positioned vertically above a portion TX1 of the transmitter trace 120-TX and a portion RX1 of the receiver trace 120-RX1, while a ferromagnetic core 110-2 is positioned over a portion TX2 and a portion RX2. The ferromagnetic core 110-1 is subjected to a strong magnetic field, while the ferromagnetic core 110-2 is subjected to a weak magnetic field or no magnetic field at all. For simplicity, the traces 120-TX and 120-RX are shown next to each other. However, in some embodiments, the traces 120-TX and 120-RX overlay each other (e.g., the 120-TX and 120-RX traces are on top of each other).

In some embodiments, the transmit coils TX1, TX2 can be connected in series similarly to the two receive coils RX1, RX2. The receive coils RX1, RX2 are connected in mutually opposing phase so that the transmit coils TX1, TX2, which see the same current, induce equal but opposite voltages in the two receive coils RX1, RX2, respectively. For example, the windings of the receive coil RX1 are laid out in an opposite way than those of the receive coil RX2. As a result, the voltage across the series combination of the receive coils RX1, RX2 have their ring down (dead time) suppressed, as explained in more detail below.

FIG. 6B shows several graphs of the receiver (RX) signals obtained with the arrangement illustrated in FIG. 6A. The upper graph illustrates the reflected ultrasound signal received by the portion RX1, the middle graph illustrates the reflected ultrasound signal received by the portion RX2, and the lower graph illustrates the summation of the signals received by the portions RX1 and RX2. Without being bound to theory, it is believed that the receiver portions RX1 and RX2 both sense a relatively strong transmitted signal for the duration of dead time $t_D$. However, because of the opposite, mirror-image windings of the portions RX1 and RX2, the received signals are out of phase. Therefore, the received signals within the $t_D$ largely cancel each other, as shown in the lower graph. In some embodiments, such cancelation of the signal within the $t_D$ improves accuracy of the measurements by reducing the ring down, especially so if the $t_D$ is relatively long and starts to encroach on the return (echo) ultrasound from the specimen.

As the strong signal during the $t_D$ dissipates, the portion RX1 that is under the ferromagnetic core 110-1 registers ultrasound echo at $t_E$. The portion RX2, being under relatively weak magnetic field of the ferromagnetic core 110-2 weakly registers or does not register the ultrasound echo. As a result, the summation of the signals in the portions RX1 and RX2 corresponds to the ultrasound echo received by the portion RX1.

Figure 7:
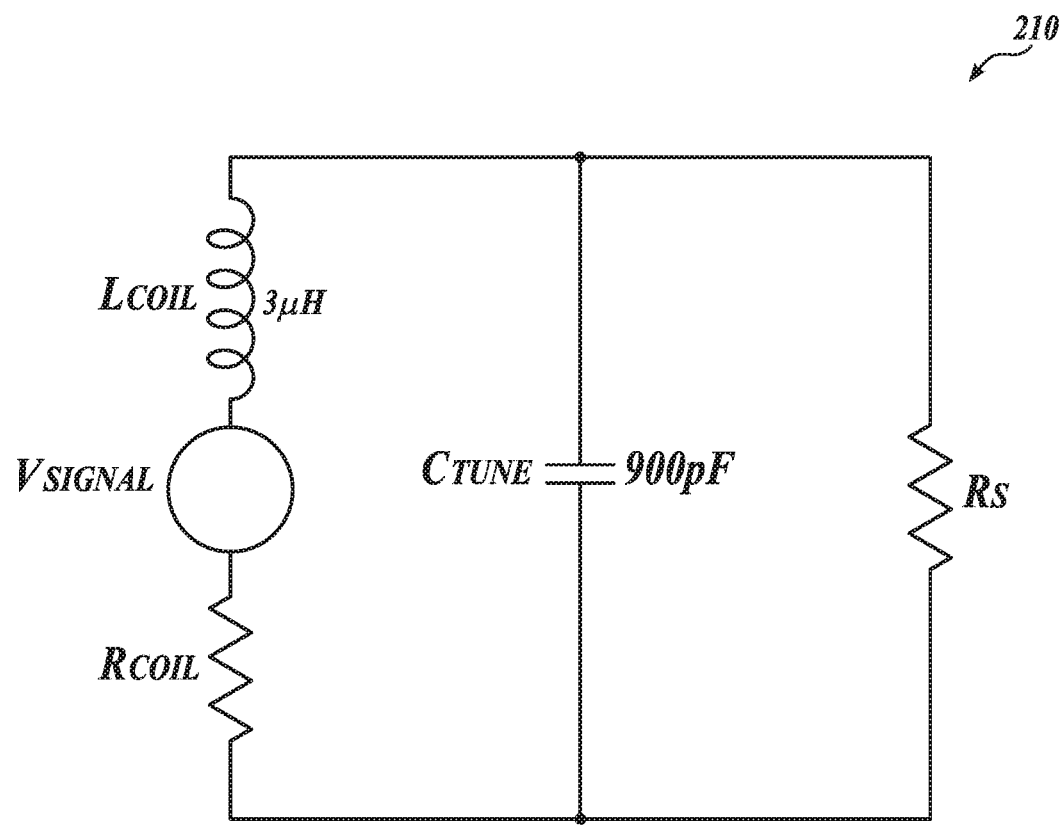
FIG. 7 is a schematic circuit topology for the EMAT in accordance with an embodiment of the presently disclosed technology.

FIG. 7 is a schematic circuit topology for the EMAT in accordance with an embodiment of the presently disclosed technology. Ctune is typically set so that it resonates with Lcoil. During the transmit time, Rs represents the effective source impedance of the transmitter (TX) combined with the dynamic resistance of the blocking diodes and any other losses on the transmit side. Once the voltage is reduced below the voltage level of the blocking diodes and the receiver switch is on, Rs represents the input impedance of receiver side. The circuit may also include any parallel resistance that is installed to help reduce ring-down.

An analysis was performed to model the component values needed to achieve a specific ring-down time. The model assumes that Lcoil is fixed and Ctune is set to resonate at the operating frequency. For the circuit shown in FIG. 7, this may be 3.06 MHz. Lcoil and Rcoil of a specific EMAT coil were measured at the operating frequency using a vector impedance analyzer over a steel sample.

For simplicity in the analysis, we may assume a decaying envelope as opposed to the actual damped sinusoid to estimate the ring-down. We may also assume that the initial conditions are such that Ctune is at maximum voltage when the drive is turned off. The quality factor for the illustrated circuit may be defined as: $Qp=Rs/2\pi f L_{coil}$ and $Qs=2\pi f L_{coil}/R_{coil}$ the parallel and series circuit Q, respectively. Qe is the parallel combination of Qp and Qs (i.e., $Qs*Qp/(Qs+Qp)$).

The decay envelope is provided in equation 1 below.

$$V(t)=V_i e^{-2\pi f t/2Qe} \quad \text{Eq. (1)}$$

If the resonant frequency is, for example, 3 MHz, the desired V(1.5 μs) is 50 μV and pulser voltage $V_i$ is 500 volts, then the equivalent Qe needs to be about 0.9. Qs is fixed by the EMAT coil and in this scenario, is about 2.7. Therefore, the required Qp for a 1.5 μs ring-down is 1.35. So, the maximum value of Rs is 76 ohms.

This sample simulation helps to determine a faster ringdown times with the circuit topology illustrated in FIG. 7. For example, the use of a parallel tuning capacitor provides no current gain in the coil for lower output impedance transmitters. However, the tuning capacitor does tune out the inductive reactance, which may be useful for some transmitters. The parallel capacitor also provides some free receiver voltage gain depending on Qs. Note that if Rs is large, the voltage produced across the circuit and into the receiver is Qs times larger than the receive signal produced in the coil.

Figure 8:
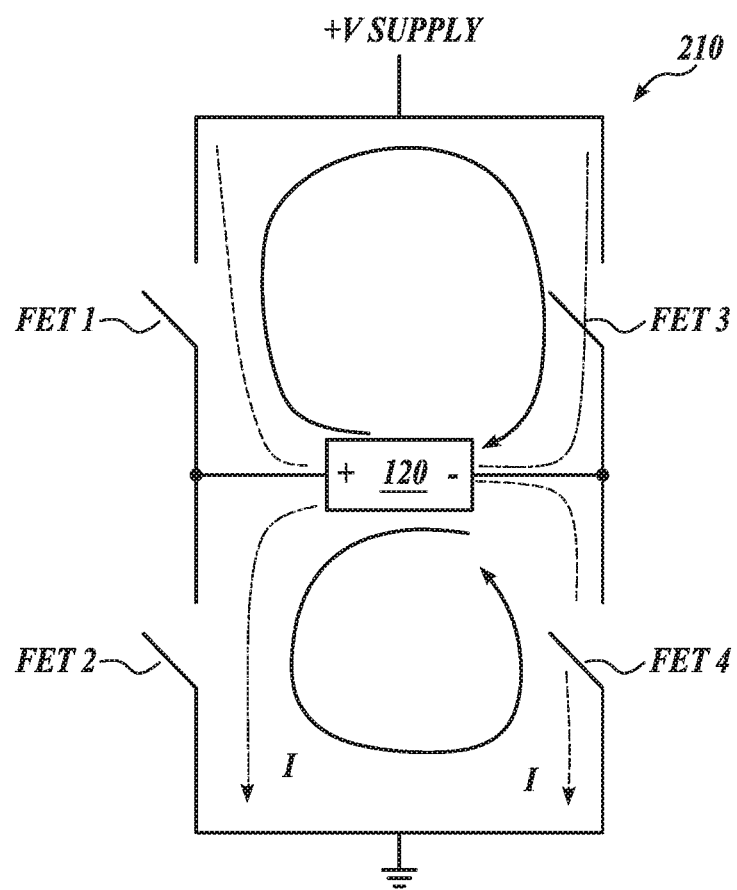
FIG. 8 is a schematics of supporting electronics for EMAT systems in accordance with the embodiments of the presently disclosed technology.

FIG. 8 is a schematics of supporting electronics for EMAT systems in accordance with the embodiments of the presently disclosed technology. The illustrated schematics is also referred to as an H-bridge drive. The phantom line represents the current path when field effect transistors (FETs) 2 and 3 are ON. The solid line represents the current path when FET 2 and FET 4 are ON, or when FET 1 and FET 3 are ON. The dash line represents the current path when FET 1 and FET 4 are closed. In some embodiments, other types of fast switches may be used, for example, bipolar transistors.

In some embodiments, opening and closing the FETs 1-4 drives a current I in a desired direction through the coil 120. For example, the lower FETs (FETs 2 and 4) of the H-bridge drive may be left ON during the receiving window to help pull energy out of the EMAT sensor at the end of the transmit (TX) cycle. In some embodiments, the receiver of the EMAT may be protected by utilizing both a diode blocking array and an based blocking/protection. In some embodiments, the dead time $t_D$ or the current in the EMAT coil 120 may be monitored. Based on this monitoring, a dynamic adjustment of the H-bridge drive may minimize the residual current or energy in the EMAT sensor at the end of the burst (e.g., at the end of the dead time $t_D$).

In some embodiments, the EMAT may use 1000 V drive signals for the TX, and 10-100 μV signals must be detected and measured by the RX within microseconds of turning off the drive.

Figure 9:
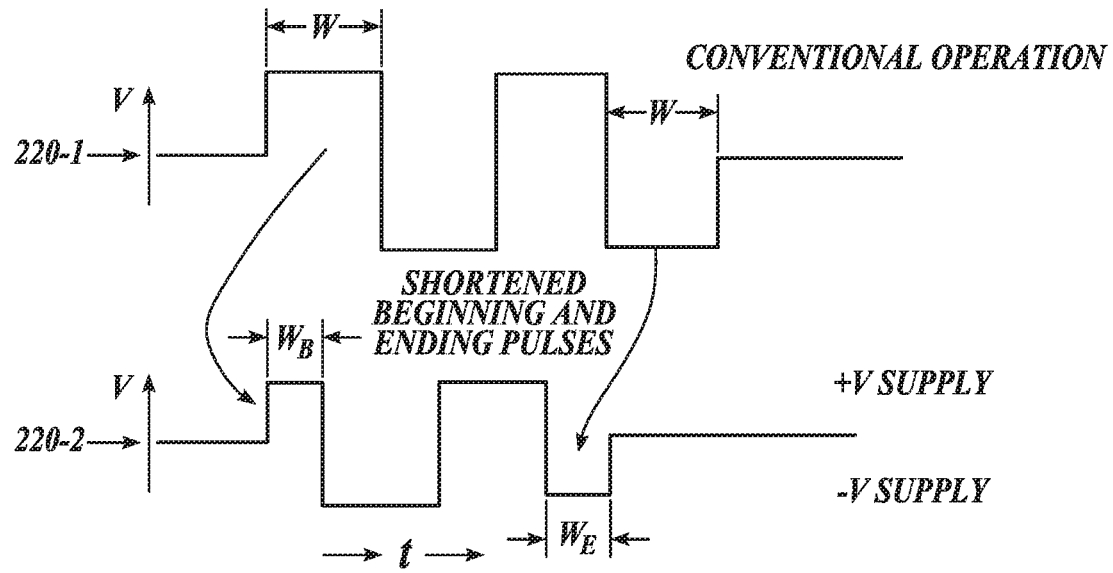
FIGS. 9 and 10 show pulse diagrams for EMAT systems in accordance with the embodiments of the presently disclosed technology.
Figure 10:
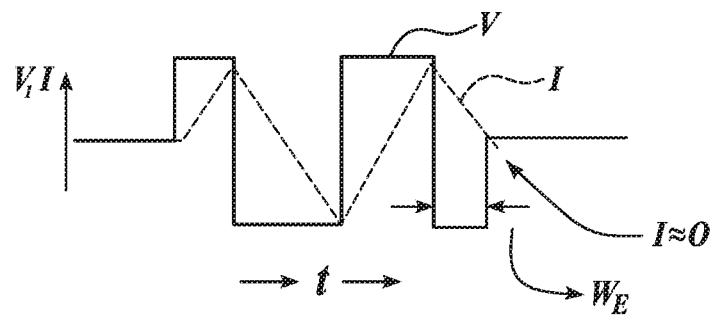

FIGS. 9 and 10 show pulse diagrams for EMAT systems in accordance with the embodiments of the presently disclosed technology. FIG. 9 includes two graphs. The upper graph illustrates a conventional train of voltage pulses 220-1 at the coil 120. The conventional train of voltage pulses is a square wave having the uniform width of the pulses W within the train of pulses. The lower graph illustrates a train of voltage pulses 220-2 applied to the coil 120 in some embodiments of the present technology. For example, the train of voltage pulses 220-2 may start with a beginning pulse $W_B$ that is shorter (having a shorter duration) than the subsequent voltage pulses. In some embodiments, the train of voltage pulses 220-2 ends with an ending pulse $W_E$ that is also shorter than the preceding voltage pulses. In some embodiments, the beginning pulse $W_B$ and/or the ending pulse $W_E$ have a width that is about one half of the width of the pulses in the middle of the train. In some embodiments, the beginning pulse $W_B$ and the ending pulse $W_E$ may have the same width. The width of the beginning pulse $W_B$ and the ending pulse $W_E$ may be adjustable through hardware or software. In some embodiments, width of the beginning pulse $W_B$ and the ending pulse $W_E$ May be adjustable dynamically during the measurements. Some advantages of the beginning and/or ending pulse having different widths are explained with respect to FIG. 10 below.

FIG. 10 illustrates trains of voltage and current pulses in accordance with an embodiment of the presently disclosed technology. The train of voltage pulses V generally corresponds to the train 220-2 illustrated in FIG. 9. Without being bound to theory, the train of current pulses I generally depends on the inductance and resistance of the coil 120 as a transfer function, and the voltage pulses V as an input variable. In some embodiments, the width of the voltage pulses, including the width of the ending pulse $W_E$, may be selected such that the current in the coil 120 is zero or close to zero at the end of the pulse train. In some embodiments, when the current in the EMAT coil is near zero at the end of the TX voltage pulse sequence (train), the ring-down or dead time $t_D$ is reduced.

Figure 11:
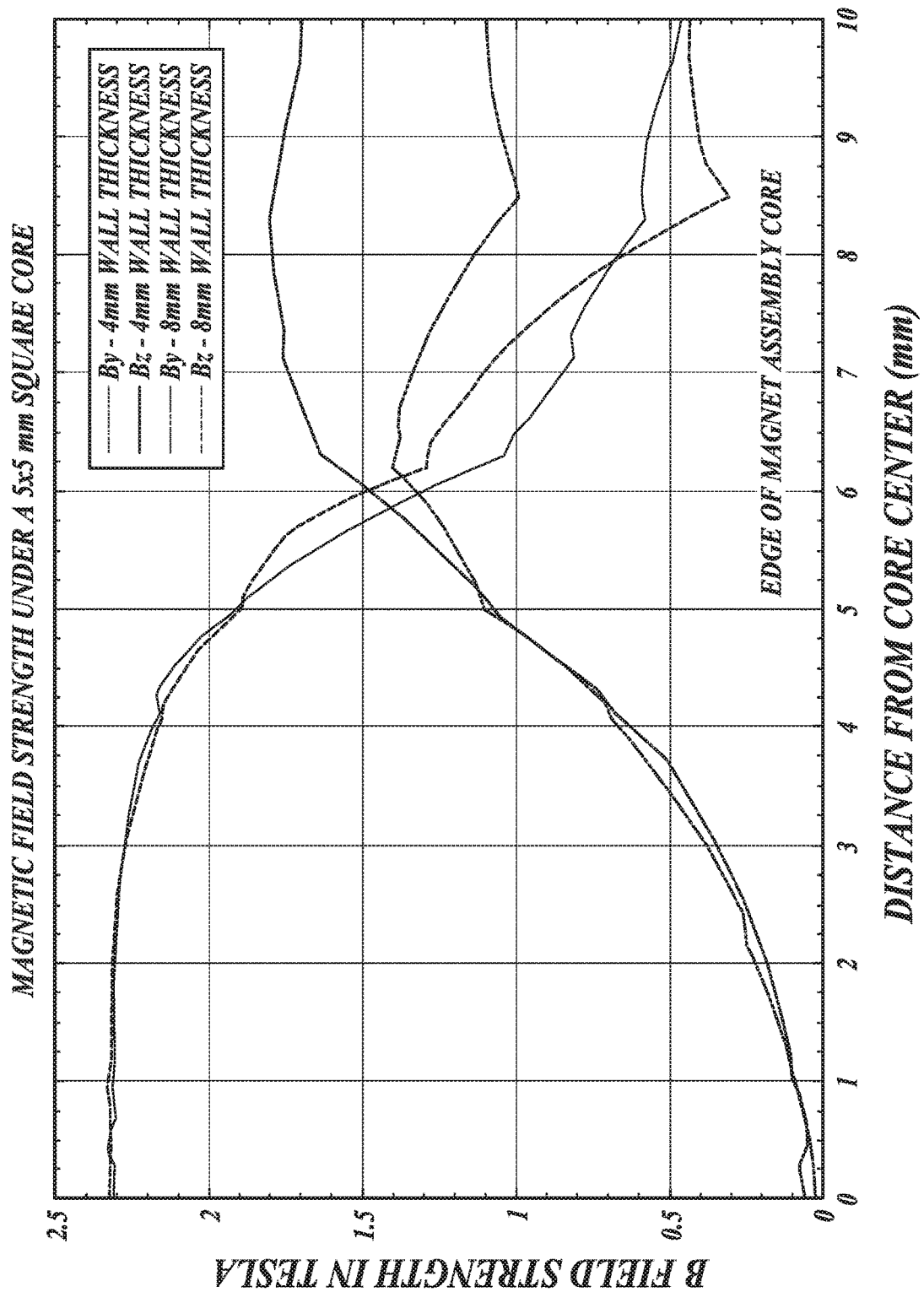
FIGS. 11 and 12 show simulation results for an EMAT system for steel and aluminum plates, respectively, in accordance with the embodiments of the presently disclosed technology.
Figure 12:
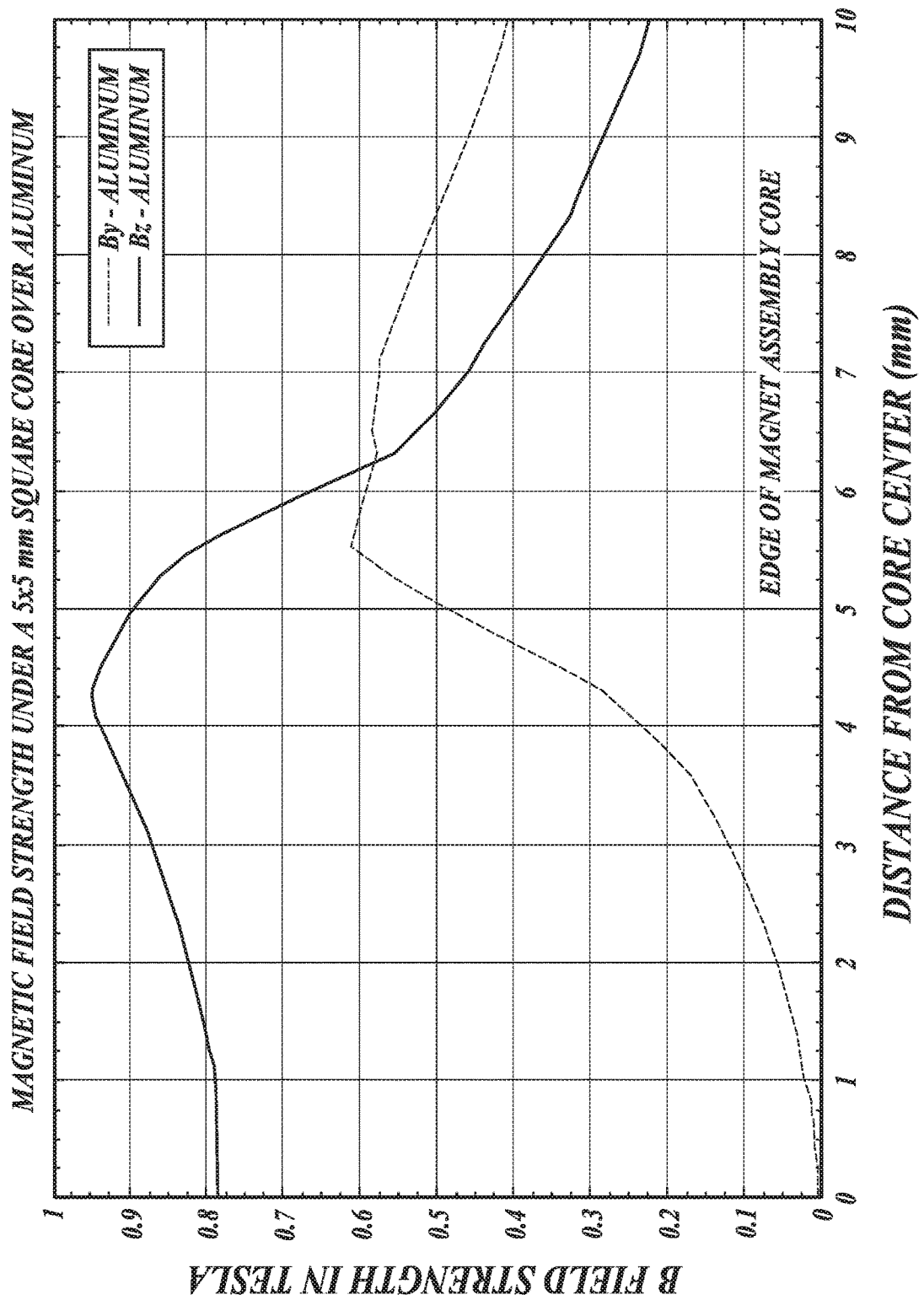

FIGS. 11 and 12 show simulation results for an EMAT system for steel and aluminum plates, respectively, in accordance with the embodiments of the presently disclosed technology. For both graphs, the horizontal axis represents a distance from the core center in mm, and the vertical axis represents magnetic field strength in Tesla. The simulation results are shown with the zero on the horizontal axis starting at the center of the ferromagnetic core. Due to the symmetry of the simulated field, only one half of the field needs to be shown.

The simulation results shown in FIG. 11 correspond to 4 mm and 8 mm steel plates. The simulation results shown in FIG. 12 correspond to an aluminum plate. In each figure, magnetic field Bz is vertical with respect to the surface of the specimen and magnetic field By is parallel with respect to the surface of the specimen.

The illustrated simulations correspond to 1 mm lift-off from the surface of the specimen, and the results are simulated at 0.1 mm into the test plate (for the steel plate). Besides the significant increase in static field over steel, the ratio of the Bz to By near the edge of the core is approximately 6:1. In principle, the larger the ratio the better the mode purity as the By component will produce longitudinal wave, as opposed to the desired shear waves that are produced by Bz that travel at a slower speed. In general, better mode purity produces more accurate and easier to interpret results. A 2:1 ratio for Bz:By is generally a desired ratio for the EMTs, which is exceeded in the illustrated simulation up to about 4.5 mm distance from the center of the ferromagnetic core 110. Furthermore, the simulated Bz is almost constant for about 4 mm distance from the center of the ferromagnetic core 110, indicating a relatively uniform magnetic fields Bz across the ferromagnetic core.

FIG. 12 corresponds to the simulated result for aluminum, which has the same magnetic permeability as the air. The simulated Bz of about 0.8 T is considerably less than the simulated Bz over steel shown in FIG. 11 at about 2.3 T. Stated differently, the use of the 10×10×40 mm ferromagnetic steel core instead of just air separating the magnets from the specimen increases the Bz by about 3 times. As explained above, a 3× increase in the magnetic field results in an allowable decrease in sensor area by $3^2$ or 9× while maintaining the same transfer impedance (or sensitivity of the instrument).

Figure 13:
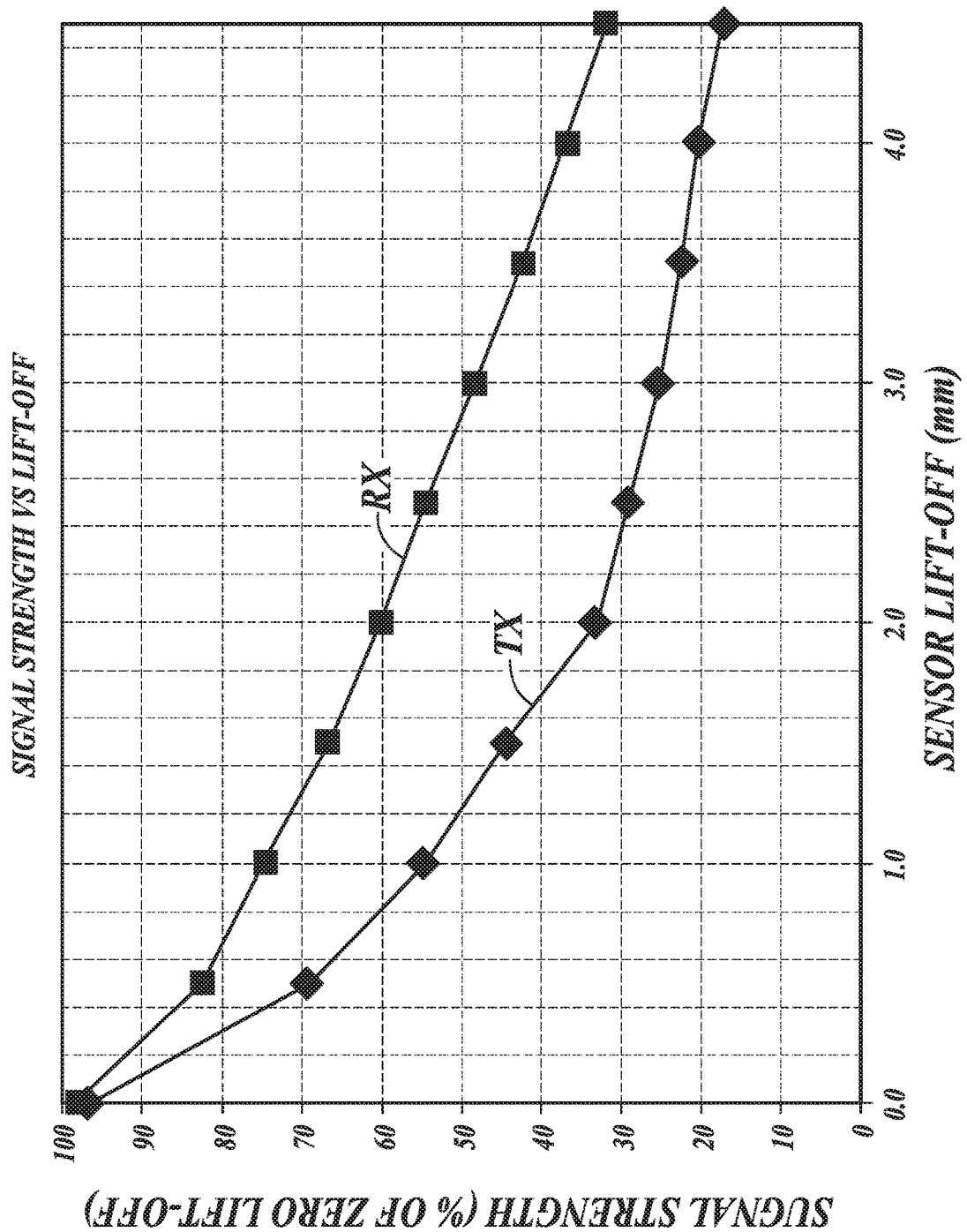
FIG. 13 is a graph of signal strength versus lift-off in accordance with an embodiment of the presently disclosed technology.

FIG. 13 is a graph of signal strength versus lift-off in accordance with an embodiment of the presently disclosed technology. For this simulation, two EMAT sensors having the same coils 120 were placed on the opposite sides of a 1" thick steel plate. One EMAT sensor was used for transmit (TX) and the other used for receive (RX) function. Shims in 0.5 mm increments were used to adjust the transmitter lift-off. The experiment was repeated using the shims under the receiver and leaving the transmitter at zero lift-off. In some embodiments, the receive coil is less sensitive to lift-off compared to the transmit coil. With the receiver coil lift-off of 1 mm, the receiver is almost 40% stronger than the transmitter having the coil lift-off of 1 mm. Therefore, if separate transmit and receive coils are used for same EMAT, the transmit coil may be positioned closer to the surface while the less position-sensitive receive coil is farther from the surface of the specimen. In at least some embodiments, such an arrangement of the receiver and transmitter coils may reduce the mutual inductance, which generally reduces the transmit energy coupled into the receiver.

Figure 14:
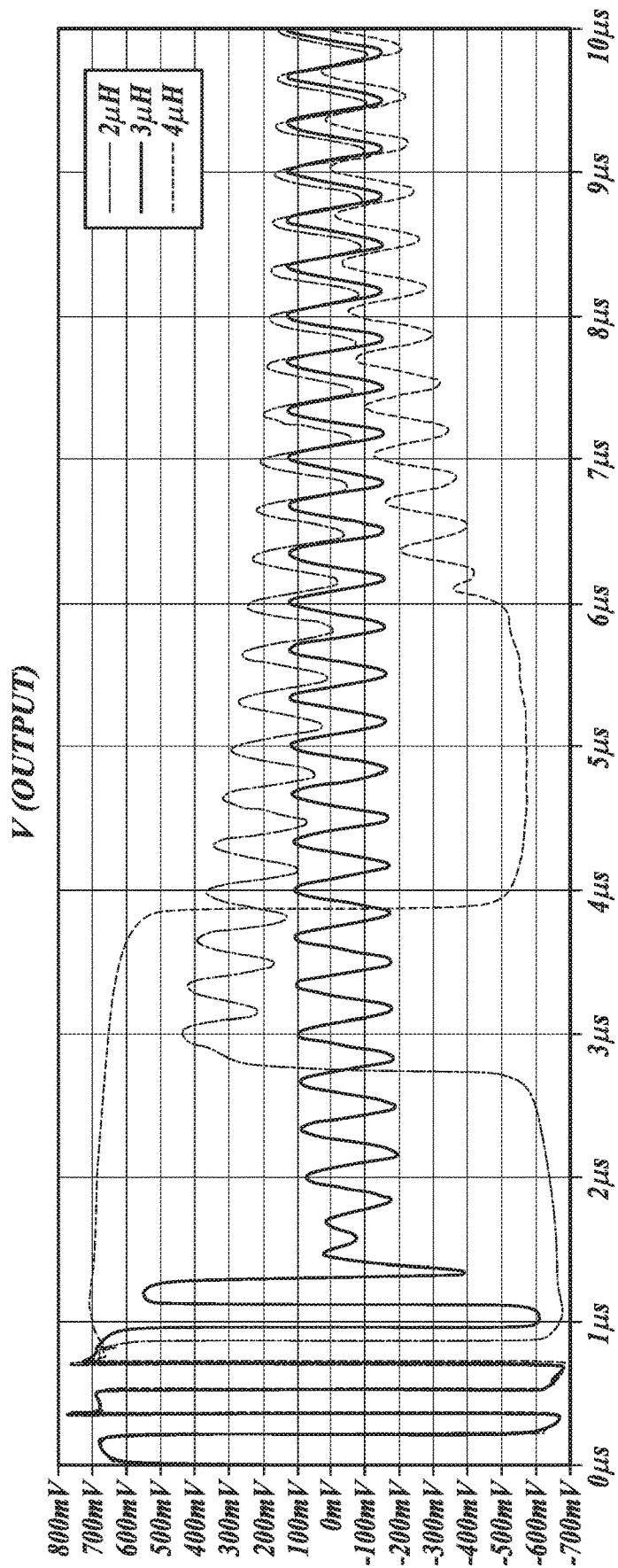
FIG. 14 shows simulation results of output voltage versus time for an EMAT system in accordance with the embodiments of the presently disclosed technology.

FIG. 14 shows simulation results of output voltage versus time for an EMAT system in accordance with the embodiments of the presently disclosed technology. The simulated EMAT system included the H-bridge drive, transformer coupling, blocking diode array, EMAT coil, resonating capacitor and a MOSFET-based switch to isolate the receiver from the high voltage signals. The system was modeled in LTSpice. To simulate when the received signal could pass through the receiver switch, a 0.1 V p-p source was placed in series with the EMAT sense coil. Various values in the design were adjusted and the LTSpice output of the receiver switch as shown in FIG. 8. The three traces simulate a variation in inductance that may occur when the sensor lift-off varies. The solid line trace is the nominal 3 μH inductance that was measured from one of the EMAT coils. The phantom line trace is for an inductance of 2 μH and the dash line trace is for an inductance of 4 μH. The simulation results indicate significant variation in the ring-down time between the three inductances (2 μH, 3 μH, and 4 μH). The simulation uses a two-cycle transmit pulse at 3 MHz, or 0.67 μs period. The receive signal begins to pass through at approximately 1.7 μs for the optimum inductance.

Figure 15:
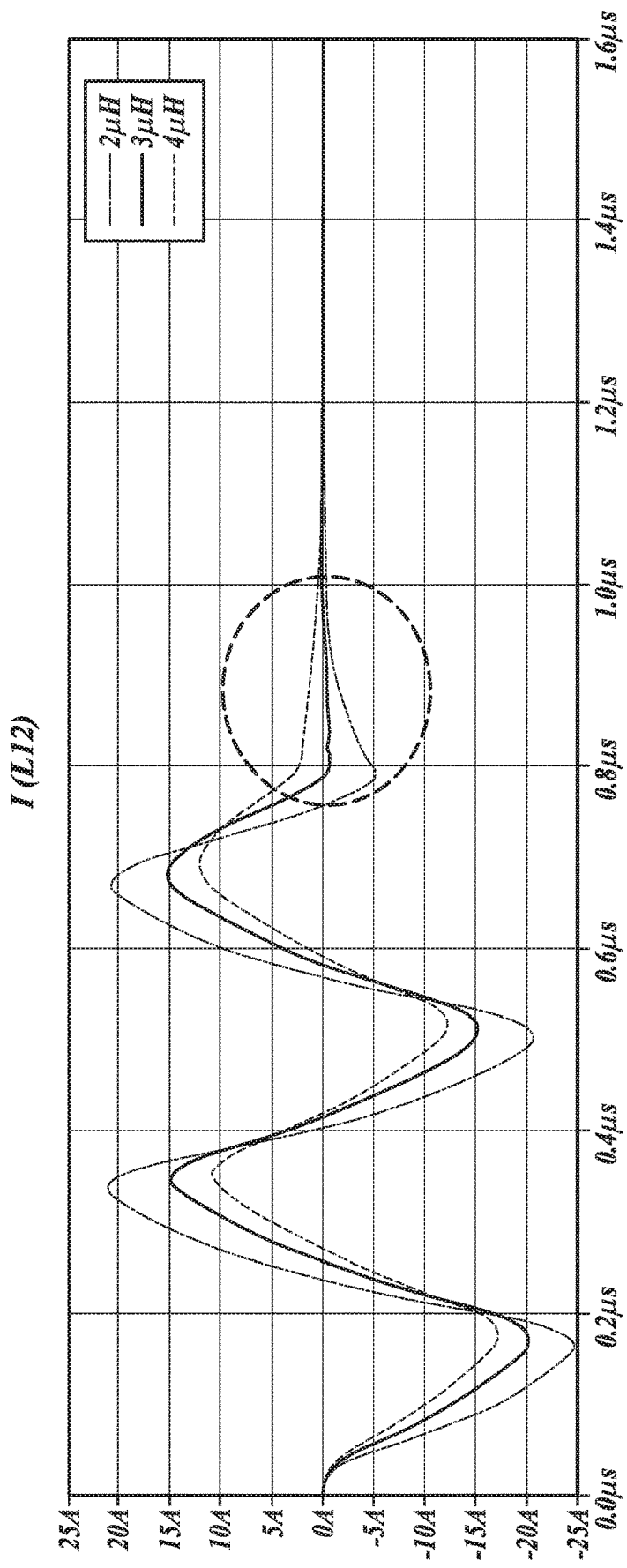
FIG. 15 shows simulation results of current versus time for an EMAT system in accordance with the embodiments of the presently disclosed technology.

FIG. 15 shows simulation results of current versus time for an EMAT system in accordance with the embodiments of the presently disclosed technology. The transmitter current passing through EMAT coil is shown in FIG. 15 for the three different inductances. For the minimum ring-down (dead time $t_D$), the current in the EMAT coil is near a minimum at the end of the transmit pulse sequence (the circled area in FIG. 15). The positive and negative peaking in the receive signals correspond to negative or positive remaining current in the EMAT coil. In some embodiments, the transmit pulse width can be optimized (as shown in FIGS. 9 and 10) to minimize the current in the EMAT coil at the end of the transmit pulse sequence. From a system implementation perspective, this may be complicated by the fact that the inductance changes with sensor lift-off from the pipe wall. Mechanically the system should minimize lift-off variations, however there will be some variation in the system. Therefore, transmit pulse adjustment can be done dynamically during operation for optimum ring-down. The simulation results for 3 pH case show relatively low current at the end of the receive signals, which is a desired case. Therefore, based on this simulation, the EMAT designer may select the coil 120 having the inductance of 3 pH.

Many embodiments of the technology described above may take the form of computer- or controller-executable instructions, including routines executed by a programmable computer or controller. Those skilled in the relevant art will appreciate that the technology can be practiced on computer/controller systems other than those shown and described above. The technology can be embodied in a special-purpose computer, controller or data processor that is specifically programmed, configured or constructed to perform one or more of the computer-executable instructions described above. Accordingly, the terms "computer" and "controller" as generally used herein refer to any data processor and can include Internet appliances and hand-held devices (including palm-top computers, wearable computers, cellular or mobile phones, multi-processor systems, processor-based or programmable consumer electronics, network computers, mini computers and the like).

From the foregoing, it will be appreciated that specific embodiments of the technology have been described herein for purposes of illustration, but that various modifications may be made without deviating from the disclosure. Moreover, while various advantages and features associated with certain embodiments have been described above in the context of those embodiments, other embodiments may also exhibit such advantages and/or features, and not all embodiments need necessarily exhibit such advantages and/or features to fall within the scope of the technology. Accordingly, the disclosure can encompass other embodiments not expressly shown or described herein.

We claim:

1. An apparatus for detecting or measuring corrosion or erosion in an object, comprising:
an electromagnetic acoustic transducer (EMAT) having:
a ferromagnetic core;
a plurality of permanent magnets arranged peripherally around the ferromagnetic core and configured to produce a magnetic field through the ferromagnetic core; and
a coil configured between the ferromagnetic core and the object,
wherein the ferromagnetic core protrudes toward the coil out of an outer surface of the plurality of permanent magnets,
wherein the ferromagnetic core is moveable with respect to the plurality of permanent magnets, and
wherein the ferromagnetic core is held in place by the plurality of permanent magnets.

2. The apparatus of claim 1, wherein the plurality of permanent magnets comprises a first magnet, a second magnet, a third magnet and a fourth magnet, and wherein each magnet faces a side of the ferromagnetic core with the same magnetic pole.

3. The apparatus of claim 2, wherein the plurality of permanent magnets further comprises a fifth magnet that faces a top side of the ferromagnetic core opposite from the object, and wherein the fifth magnet faces the ferromagnetic core with the same magnetic pole as the first, second, third and fourth magnets.

4. The apparatus of claim 2, wherein the first permanent magnet has a first width facing the ferromagnetic core, and the second permanent magnet has a second width facing the ferromagnetic core, and wherein the first width and the second width are different.

5. The apparatus of claim 1, wherein the plurality of permanent magnets includes wedge shaped magnets around the ferromagnetic core.

6. The apparatus of claim 1, wherein the plurality of permanent magnets is a first plurality of permanent magnets, and the ferromagnetic core is a first ferromagnetic core, the apparatus further including a second plurality of permanent magnets and a second ferromagnetic core, wherein at least one permanent magnet of the first plurality faces the first ferromagnetic core with one magnetic pole and the second ferromagnetic core with another magnetic pole.

7. The apparatus of claim 1, wherein the ferromagnetic core comprises laminated sheets, and wherein individual laminated sheets of the ferromagnetic core are generally perpendicular to the coil.

8. The apparatus of claim 1, wherein sides of a cross-section of the ferromagnetic core range from about ¼"×¼" to about ½"×½".

9. The apparatus of claim 1, wherein a diameter of a cross-section of the ferromagnetic core ranges from about ¼" to about ½".

10. The apparatus of claim 1, wherein the coil comprises a transmitter (TX) coil and a receiver (RX) coil that are stacked between the object and the ferromagnetic core.

11. The apparatus of claim 10, wherein the TX coil is closer to the object than the RX coil.

12. The apparatus of claim 11, wherein the TX coil comprises a first TX conductive trace (TX1) and a second TX conductive trace (TX2), and the RX coil comprises a first RX conductive trace (RX1) and second RX conductive trace (RX2), wherein the TX1 and the RX1 are under the ferromagnetic core, and wherein windings of the RX2 are laid out as a mirror-image of winding of the RX1.

13. The apparatus of claim 1, wherein the coil includes conductive traces with serrated edges.

14. An apparatus for detecting or measuring corrosion or erosion in an object, comprising:
an electromagnetic acoustic transducer (EMAT) having:
a ferromagnetic core;
a plurality of permanent magnets arranged peripherally around the ferromagnetic core and configured to produce a magnetic field through the ferromagnetic core; and
a coil configured between the ferromagnetic core and the object, wherein the coil includes conductive traces encapsulated in a sound absorbing cladding.

15. The apparatus of claim 1, further comprising a plurality of switches electrically connected to the coil.

16. The apparatus of claim 15, wherein individual switches of the plurality of switches are field effect transistors (FETs) that are individually controllable.

17. A method for detecting or measuring corrosion or erosion in an object, comprising:
generating a magnetic field through a ferromagnetic core by a plurality of permanent magnets arranged peripherally around the ferromagnetic core;
generating a current in a coil configured between the ferromagnetic core and the object;
generating transmitted ultrasound waves in the object; and
detecting reflected ultrasound waves, wherein variations in the reflected ultrasound waves are caused by corrosion in the object,
wherein the ferromagnetic core protrudes toward the coil out of an outer surface of the plurality of permanent magnets,
wherein the ferromagnetic core is moveable with respect to the plurality of permanent magnets, and
wherein the ferromagnetic core is held in place by the plurality of permanent magnets.

18. The method of claim 17, wherein the current in the coil is generated by a series of voltage pulses, and wherein a leading voltage pulse or a trailing voltage pulse in the series are shorter than the pulses in the middle of the series.

19. The method of claim 18, wherein the current in the coil is about zero at an ending edge of the trailing voltage pulse.

20. The method of claim 18, wherein the leading voltage pulse or the trailing voltage pulse is adjustable to reduce a dead time for detecting the reflected ultrasound waves.

21. The method of claim 17, wherein the current in the coil is controlled by a set of independently openable and closeable field effect transistors (FETs).

22. The method of claim 21, further comprising changing a direction of the current in the coil by opening and closing the FETs.

23. The method of claim 22, wherein, during detecting reflected ultrasound waves, at least two FETs are in a closed position.

24. The method of claim 17, further comprising canceling a dead time in the coil, wherein the coil comprises a transmitter (TX) coil and a receiver (RX) coil that are stacked between the object and the ferromagnetic core, wherein the TX coil comprises a first TX conductive trace (TX1) and a second TX conductive trace (TX2), and the RX coil comprises a first RX conductive trace (RX1) and a second RX conductive trace (RX2), wherein the TX1 and the RX1 are under the ferromagnetic core and wherein windings of the RX2 are laid out as a mirror-image of winding of the RX1.

25. The method of claim 17, wherein the transmitted ultrasound waves travel in a non-perpendicular direction with respect to a surface of the object.

* * * * *

UNITED STATES PATENT AND TRADEMARK OFFICE
CERTIFICATE OF CORRECTION

| | | |
|---|---|---|
| PATENT NO. | : 11,209,401 B2 | Page 1 of 1 |
| APPLICATION NO. | : 16/490479 | |
| DATED | : December 28, 2021 | |
| INVENTOR(S) | : P. Bondurant et al. | |

It is certified that error appears in the above-identified patent and that said Letters Patent is hereby corrected as shown below:

In the Specification

| Column | Line | |
|---|---|---|
| 1 | 14 | Before "BACKGROUND", please add -- STATEMENT OF GOVERNMENT LICENSE RIGHTS This invention was made with Government support under Agreement No. DTPH5616T00002 awarded by the U.S. Department of Transportation, PHMSA. The Government may have certain rights to this Invention. -- |

Signed and Sealed this
Twenty-first Day of February, 2023

Katherine Kelly Vidal
*Director of the United States Patent and Trademark Office*